United States Patent
Timmins et al.

(10) Patent No.: US 8,938,060 B2
(45) Date of Patent: Jan. 20, 2015

(54) TECHNIQUE FOR EFFECTIVELY PROVIDING PERSONALIZED COMMUNICATIONS AND INFORMATION ASSISTANCE SERVICES

(75) Inventors: Timothy A. Timmins, Tigard, OR (US);
Nathan B. Baker, Tigard, OR (US);
John S. Miller, Canby, OR (US);
Christopher A. Huey, Banks, OR (US);
Philip A. Ljubicich, Lake Forest Park, WA (US); Gary E. Henry, Tigard, OR (US)

(73) Assignee: Grape Technology Group, Inc., Bethlehem, PA (US)

( * ) Notice: Subject to any disclaimer, the term of this patent is extended or adjusted under 35 U.S.C. 154(b) by 2238 days.

(21) Appl. No.: 11/525,289

(22) Filed: Sep. 21, 2006

(65) Prior Publication Data

US 2007/0121882 A1    May 31, 2007

(51) Int. Cl.
*H04M 3/42* (2006.01)
*H04L 29/08* (2006.01)
*H04M 3/493* (2006.01)

(52) U.S. Cl.
CPC ............. *H04L 67/34* (2013.01); *H04M 3/4931* (2013.01); *H04M 2203/554* (2013.01); *H04L 67/06* (2013.01)
USPC ................ 379/218.02; 379/265.01; 705/14.4; 705/14.41; 705/14.49; 705/14.62

(58) Field of Classification Search
USPC ............. 709/229; 705/31, 14.1–14.14, 14.22, 705/14.23, 14.27, 14.31–14.34, 14.36, 705/14.39–14.41, 14.49, 14.51, 14.62, 705/14.67–14.73; 379/114.1–114.13, 379/121.02, 201.01, 218.01, 218.02
See application file for complete search history.

(56) References Cited

U.S. PATENT DOCUMENTS

| | | | |
|---|---|---|---|
| 4,551,581 | A | 11/1985 | Doughty |
| 4,582,956 | A | 4/1986 | Doughty |
| 4,959,855 | A | 9/1990 | Daudelin |
| 4,969,185 | A | 11/1990 | Dorst et al. |
| 4,979,206 | A | 12/1990 | Padden et al. |
| 5,058,152 | A | 10/1991 | Solomon et al. |
| 5,163,083 | A | 11/1992 | Dowden et al. |
| 5,367,561 | A | 11/1994 | Adler et al. |
| 5,450,476 | A | 9/1995 | D'Apuzzo et al. |
| 5,457,738 | A | 10/1995 | Sylvan |

(Continued)

FOREIGN PATENT DOCUMENTS

| | | |
|---|---|---|
| WO | WO 95/17733 | 6/1995 |
| WO | WO 01/56262 | 8/2001 |

*Primary Examiner* — Md S Elahee
(74) *Attorney, Agent, or Firm* — Sofer & Haroun, LLP

(57) ABSTRACT

A user may utilize a communication device, e.g., a wireless phone, mobile device or personal digital assistant (PDA), to contact an information/call center where an operator provides personalized information and communications services to the user in accordance with the invention. Such services may include, e.g., private directory and calendar data synchronization, identity pre-validation, etc. To personalize the services, at least one profile record associated with the user which may specify, among others, the devices used by the user to communicate with the information/call center, and preferred information/call center to which an information assistance call is routed. Accordingly, services and service features provided to the user may be tailored for use with the specified devices. Security measures may also be instituted in the profile record to restrict use of certain services and service features.

15 Claims, 14 Drawing Sheets

(56) References Cited

U.S. PATENT DOCUMENTS

| | | | |
|---|---|---|---|
| 5,613,006 A | 3/1997 | Reese | |
| 5,644,711 A | 7/1997 | Murphy | |
| 5,652,789 A | 7/1997 | Miner et al. | |
| 5,675,637 A | 10/1997 | Szlam et al. | |
| 5,689,547 A | 11/1997 | Molne | |
| 5,797,126 A | 8/1998 | Helbling et al. | |
| 5,835,570 A | 11/1998 | Wattenbarger | |
| 5,848,131 A | 12/1998 | Shaffer et al. | |
| 5,850,433 A | 12/1998 | Rondeau | |
| 5,873,032 A | 2/1999 | Cox et al. | |
| 5,887,057 A | 3/1999 | Pickeral | |
| 5,897,620 A | 4/1999 | Walker et al. | |
| 5,933,778 A | 8/1999 | Buhrmann et al. | |
| 5,943,417 A | 8/1999 | Cox et al. | |
| 5,953,393 A | 9/1999 | Culbreth et al. | |
| 5,966,437 A | 10/1999 | Cox et al. | |
| 5,974,132 A | 10/1999 | Ricciardi et al. | |
| 5,982,870 A | 11/1999 | Pershan et al. | |
| 5,983,200 A | 11/1999 | Slotznick | |
| 6,035,190 A | 3/2000 | Cox et al. | |
| 6,049,796 A | 4/2000 | Siitonen et al. | |
| 6,055,307 A | 4/2000 | Behnke et al. | |
| 6,058,169 A | 5/2000 | Bramnick et al. | |
| 6,065,016 A | 5/2000 | Stuntebeck et al. | |
| 6,076,093 A | 6/2000 | Pickering | |
| 6,081,898 A | 6/2000 | Miller et al. | |
| 6,084,953 A * | 7/2000 | Bardenheuer et al. | ... 379/114.01 |
| 6,094,640 A | 7/2000 | Goheen | |
| 6,125,172 A * | 9/2000 | August et al. | ............ 379/110.01 |
| 6,134,530 A | 10/2000 | Bunting et al. | |
| 6,205,436 B1 | 3/2001 | Rosen | |
| 6,246,759 B1 | 6/2001 | Greene et al. | |
| 6,320,956 B1 | 11/2001 | Cherry | |
| 6,324,884 B1 | 12/2001 | Barjesteh et al. | |
| 6,404,876 B1 | 6/2002 | Smith et al. | |
| 6,404,884 B1 | 6/2002 | Marwell et al. | |
| 6,442,263 B1 | 8/2002 | Beaton et al. | |
| 6,459,782 B1 | 10/2002 | Bedrosian et al. | |
| 6,477,578 B1 * | 11/2002 | Mhoon | ......................... 709/229 |
| 6,535,596 B1 | 3/2003 | Frey et al. | |
| 6,539,080 B1 | 3/2003 | Bruce et al. | |
| 6,542,596 B1 | 4/2003 | Hill et al. | |
| 6,665,389 B1 | 12/2003 | Haste | |
| 6,697,632 B1 | 2/2004 | Sood | |
| 6,714,536 B1 | 3/2004 | Dowling | |
| 6,731,927 B1 | 5/2004 | Stern et al. | |
| 6,798,772 B2 | 9/2004 | Bergman et al. | |
| 6,845,155 B2 | 1/2005 | Elsey | |
| 6,853,636 B1 | 2/2005 | Merchant | |
| 6,934,277 B1 | 8/2005 | Werve et al. | |
| 6,944,273 B2 | 9/2005 | Huna | |
| 2001/0025256 A1* | 9/2001 | Oliphant et al. | ................. 705/26 |
| 2001/0049617 A1 | 12/2001 | Berenson et al. | |
| 2002/0032589 A1 | 3/2002 | Shah | |
| 2002/0055351 A1 | 5/2002 | Elsey et al. | |
| 2003/0119492 A1 | 6/2003 | Timmons et al. | |
| 2004/0029567 A1 | 2/2004 | Timmons et al. | |
| 2007/0207775 A1* | 9/2007 | Denenberg et al. | ........... 455/406 |
| 2012/0041805 A1* | 2/2012 | Golden et al. | ................ 705/14.1 |

* cited by examiner

| INFORMATION/CALL CENTER | NUMBER OF CALLS | AVERAGE RATING |
|---|---|---|
| NY1011 | 2 | 0 |
| NY1023 | 10 | 8.5 |
| ⋮ | ⋮ | ⋮ |

FIG. 7
500

| | CALL HANDLING PREFERENCES | |
|---|---|---|
| 514 — | DR. SMITH | ☐ TEMPORARY |
| 516 — | SPANISH | ☐ TEMPORARY |
| 518 — | INFORMATION/CALL CENTER | NY1023 |

SERVICE PREFERENCES

512 — ☑ PERSONALIZED INFORMATION MANAGEMENT SERVICE
520 — ☐ CALLER-ID SERVICE
522 — ☑ PREFERRED INFORMATION/CALL CENTER

PERSONAL INTERESTS —— 540
    MUSIC: BEATLES, ROLLING STONES, ...
    FASHION: VERSACE, DONNA KAREN, ...
    SPORTS
    EVENTS: KNICKS BASKETBALL GAMES,
             PGA GOLF TOURNAMENTS, ...

INFORMATION DELIVERY METHOD PREFERENCES —— 550
    VOICE MAIL   555-432-1012
    WAP SITE     WAP411.COM/USR
    E-MAIL        usr@aol.com —— 537

DICTIONARY —— 560        565

| CUSTOMIZED COMMAND | MENU COMMAND |
|---|---|
| "0" KEY | "*" KEY |
| "NUMBER PLEASE" | "#" KEY |
| ⋮ | ⋮ |

TEMPORARY SERVICE DISABLEMENT PERIODS —— 567
    MON-FRI        9:00AM-5:00PM
569 — ☑ MY APPOINTMENTS
530 — DEVICE DATA
    WIRELESS TELEPHONE: SMS
                           COMPLEX GRAPHICS
SECURITY
    CONCIERGE-TYPE SERVICE:   SECURITY CODE(S)
                            ⋮  535

FIG. 10

| NAME | HOME | BUSINESS | MOBILE | | |
|------|------|----------|--------|------|------|
| BOB | 709-166-5555 | 555-444-3333 | 709-123-4567 | MORE | EDIT |
| MARY LAMB | 709-133-2977 | 555-222-7777 | 709-890-1234 | MORE | EDIT |
| BAT MAN | 555-666-0000 | 646-111-0000 | 646-555-6789 | MORE | EDIT |

712 points to NAME. 705 points to MORE. 707 points to EDIT.

FIG. 11

| FIRST NAME | MIDDLE NAME | LAST NAME |
|------------|-------------|-----------|
| BOB | | |

| COMPANY NAME | ABC CORPORATION | ADDRESS | |
|--------------|-----------------|---------|---|
| DEPARTMENT | SALES | CITY | |
| TITLE | MANAGER | STATE | |

| | | | |
|---|---|---|---|
| HOME | 709 166 5555 | PRIVATE | ☒ — 807 |
| WIRELESS | 709 123 4567 | PRIVATE | ☐ — 809 |
| BUSINESS | 555 444 3333 | PRIVATE | ☐ |
| FACSIMILE | | PRIVATE | ☐ |
| EMAIL | | PRIVATE | ☐ |
| PAGER | | PRIVATE | ☐ |

SAVE    CANCEL

FIG. 12
| | NAME | HOME | BUSINESS | MOBILE | |
|---|---|---|---|---|---|
| 912 → | BOB | PRIVATE | 555-444-3333 | 709-123-4567 | MORE |
| | MARY LAMB | 709-133-2977 | 555-222-7777 | 709-890-1234 | MORE |
| | BAT MAN | 555-666-0000 | 646-111-0000 | 646-555-6789 | MORE |
FIG. 13
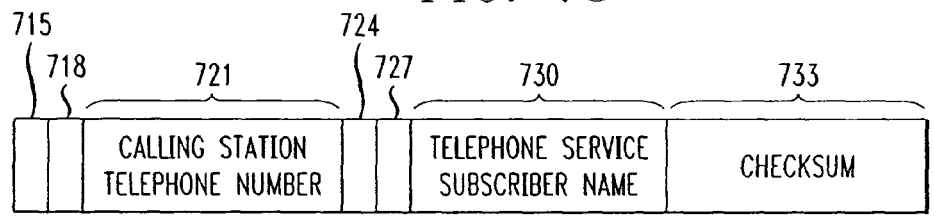
FIG. 14
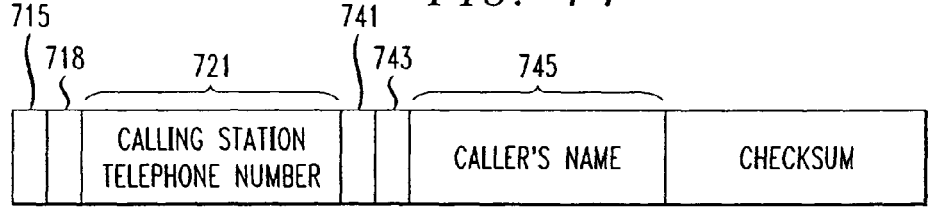
FIG. 15
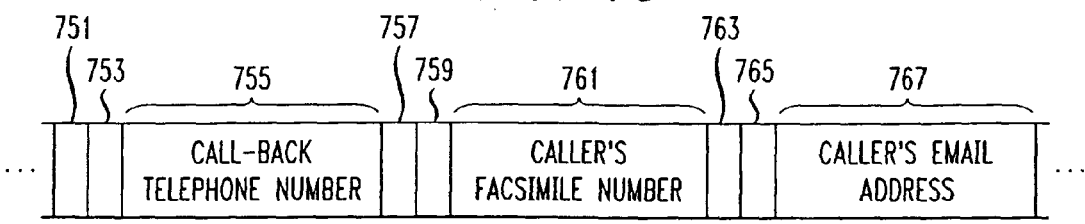
FIG. 16
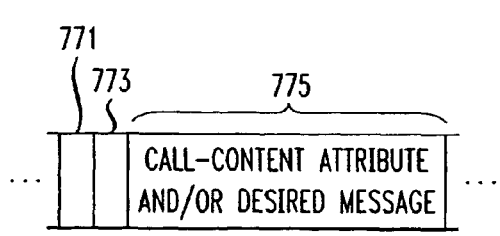

FIG. 17

| 2203 | FIRST NAME |
| 2205 | LAST NAME |
| 2207 | JOB TITLE |
| 2209 | COMPANY |
| 2211 | BUSINESS ADDRESS |
| 2213 | BUSINESS PHONE NUMBER |
| 2215 | MOBILE PHONE NUMBER |
| 2217 | HOME PHONE NUMBER |
| 2219 | E-MAIL ADDRESS |
| 2221 | WEB ADDRESS |

| 2251 | SUBJECT |
| 2253 | LOCATION |
| 2255 | ATTENDEES |
| 2257 | START TIME AND DATE |
| 2259 | END TIME AND DATE |
| 2261 | NOTE |

TECHNIQUE FOR EFFECTIVELY PROVIDING PERSONALIZED COMMUNICATIONS AND INFORMATION ASSISTANCE SERVICES

The present application is a division of application Ser. No. 10/403,130, filed on Mar. 31, 2003, which is incorporated by reference herein and is a continuation-in-part of application Ser. No. 09/865,230, filed on May 25, 2001, and application Ser. No. 10/323,287 filed on Dec. 19, 2002, and claims the benefit thereof under 35 U.S.C. 120.

FIELD OF THE INVENTION

The invention relates to a communication system and method, and more particularly to a system and method for providing personalized information assistance and communications services.

BACKGROUND OF THE INVENTION

In this information age, people need to be well informed and organized to effectively carry out day-to-day activities, especially when they are traveling and away from their "home" base where they normally conduct their business. As a result, use of mobile devices which facilitate mobile communications such as personal digital assistants (PDAs), and wireless phones and devices is ubiquitous. For example, PDAs of the PALM type allow users to store and organize their appointments, to-do lists and contacts information. Some PDAs also allow the users to access the Internet to upload and download information, and communicate with other people and information sources via email.

Similarly, wireless phones conveniently allow users while traveling to call and communicate with other people. In case the users cannot remember the telephone number of a contact or it is not handy, or the users want to obtain directions and other information concerning, e.g., restaurants, theaters, etc., they can call operators for assistance. To that end, an expansive network of communication call centers has been established which provides users with nationwide assistance.

SUMMARY OF THE INVENTION

In order to effectively utilize the prior art operator assistance service, the service needs to be improved and, more particularly, personalized to the extent comparable to the personal assistance afforded by a user's personal aide or secretary. Some desirable personalized information assistance service features have been described, e.g., in copending commonly assigned application Ser. No. 09/865,230 ("the '230 Application") filed on May 25, 2001, hereby incorporated by reference. In particular, the '230 Application discloses an information assistance service which as part of the service maintains, for the user, contacts folders (also known as private directories), appointments folders, to-do lists, etc. The user may access, through the information assistance service, contact information, appointment information or a to-do list item in the respective folders associated with the user. In particular, a contacts folder contains contact information, such as a telephone number(s), an address(es), and e-mail address(es), for people and/or organizations. A user may have separate contacts folders for different purposes, such as a personal contacts folder, business contacts folder, etc. An appointments folder contains a user's appointment and/or calendar information, and a user may similarly have separate appointments folders for different purposes.

In addition, the '230 Application discloses that the information assistance service maintains one or more user profiles which include information pertaining to and about the user. The user may specify in a profile his/her preferred types of events, areas of interest, food, goods, services, manufacturers, merchants and other personal preferences, e.g., preferred music, fashion, sports, restaurants, seating on a plane, frequent flyer number, frequent stay number, sizes of jackets, etc. Such a profile may be used by a server to tailor the content of information delivered automatically to the user as soon as the information becomes available. The user may also specify in the profile the preferred method of handling his/her information assistance call, e.g., use of a special skilled operator, such as a Spanish speaking operator, to answer such a call. Thus, by using a profile, the user is automatically provided with a personalized service, without the need of otherwise repeating the preferences each time when calling an operator to obtain information and assistance.

The invention improves the above-described information assistance service in many ways. For example, the user may specify in the user profile a preferred information assistance service center(s) or preferred operator(s) to handle his/her information assistance calls. Thus, when a current information assistance service center receives the user's call, whether the current service center corresponds to the preferred service center is determined. If the current service center does not correspond to the preferred service center, the call is routed to the preferred service center for handling the call.

In accordance with an aspect of the invention, the user may specify in the user profile a selected period for which the information assistance service is temporarily disabled, perhaps because the user is on vacation or is busy attending a meeting during the selected period. When a caller uses the user's telephone to make an information assistance call, the call is received by the information assistance service along with an identifier associated with the user. For example, one such identifier may be an automatic number identification (ANI), representing the user's telephone number, in a signal stream for establishing the call. The user profile is then retrieved based on the identifier. If it is determined that the call is received during the selected period, the caller is denied the service.

In accordance with another aspect of the invention, the information assistance service may be tailored to include service features according to the capabilities of the user device communicating with the service. For example, where the user device is capable of receiving short message service (SMS) messages, the service features may include an SMS coupon service feature. The user may be charged for different service features. As a result, the service charges may vary with the different service features offered. The user may be charged at a discount/premium rate depending on the actual service capability, class of service, and/or preferential status of the user. The service features may also be bundled according to the device type.

In accordance with a further aspect of the invention, security measures, e.g., a password, PIN, mother's maiden name, voice print and/or other biometric measure, are instituted to ensure that only an authorized user can access select services or groups of services associated, e.g., with the user's telephone number. For example, a user may specify a password in the user profile that if a party other than the user tries to access a select service feature, e.g., restaurant reservation, using the user's telephone, the password in the user profile needs to be verified. The user may be identified based on his/her voice print on file with the information assistance service. If the voice print derived from an utterance of the calling party during an information assistance call does not correspond to the user's voice print on file, the party needs to meet a security requirement, i.e., providing a valid password in this instance, before the caller can make a restaurant reservation through the service.

In accordance with another aspect of the invention, in conducting an agent-assisted transaction, sensitive information, e.g., credit card information, may be disclosed by the user through a secure connection, separate from another connection with an agent through which nonsensitive information, e.g., order specification, is disclosed. For example, the connection with the agent may be a telephone connection through which the agent may elicit the order specification from the user, and the secure connection may be a secure uniform resource locator (URL) link to a web page where the user may enter the credit card information.

In accordance with yet another aspect of the invention, an information management service maintains databases containing, e.g., the aforementioned appointments and contacts folders for users. The database associated with a user is accessible by multiple user devices, e.g., a first personal information manager (PIM) device at work and a second PIM device at home. Through the information management service, the first device, accorded a "master" status, may unidirectionally synchronize with the second device, accorded a "slave" status. Specifically, changes in PIM data sources, e.g., calendar and contacts list, in the master device are incorporated into the corresponding data sources in the slave device, but not the other way around. To that end, master and slave devices are allowed to download information from the database associated with the user through the information management service to revise data elements in the respective data sources thereof. However, only the master devices are allowed to upload information to the information management service to update the database.

In accordance with still yet another aspect of the invention, an incoming information assistance call may be routed based on a past activity or trend to better handle the call. Where a first service location receives multiple information assistance calls from a first geographic area, a subset of the calls is determined in which information is requested concerning a second geographic area associated with a second service location. A trend may be determined when the number of calls in the subset exceeds a threshold. In that case, the first service location automatically transfers at least one subsequent information assistance call from the first geographic area received thereby to the second service location to handle the call.

In accordance with another aspect of the invention, an identity of a party may be verified using a directory database, typically maintained by a provider of directory assistance. The directory database includes records, each of which contains at least a telephone number and a name of a party. When the directory assistance provider receives information concerning a selected party whose identity is to be verified, the directory database is searched based on the received information, which includes at least a name and a telephone number associated with the selected party. If a record in the search result includes data which corresponds to the received name and telephone number associated with the selected party, a verification of the identity of the selected party is declared.

BRIEF DESCRIPTION OF THE DRAWING

Further objects, features and advantages of the invention will become apparent from the following detailed description taken in conjunction with the accompanying drawing showing an illustrative embodiment of the invention, in which:

FIG. 7 illustrates a user profile record in accordance with the invention;

FIG. 10 illustrates an Edit GUI in accordance with the invention;

FIG. 11 illustrates a GUI containing contact information in accordance with the invention;

FIG. 12 illustrates a View GUI in accordance with the invention;

FIG. 13 illustrates a first example of caller identification (CID) data to be transmitted to a called station in accordance with the invention;

FIG. 14 illustrates a second example of CID data to be transmitted to a called station in accordance with the invention;

FIG. 15 illustrates a third example of CID data to be transmitted to a called station in accordance with the invention;

FIG. 16 illustrates a fourth example of CID data to be transmitted to a called station in accordance with the invention;

FIG. 17 illustrates a GUI particularly useful for an operator to search for directory information concerning a desired party in accordance with the invention;

DETAILED DESCRIPTION

Figure 1:
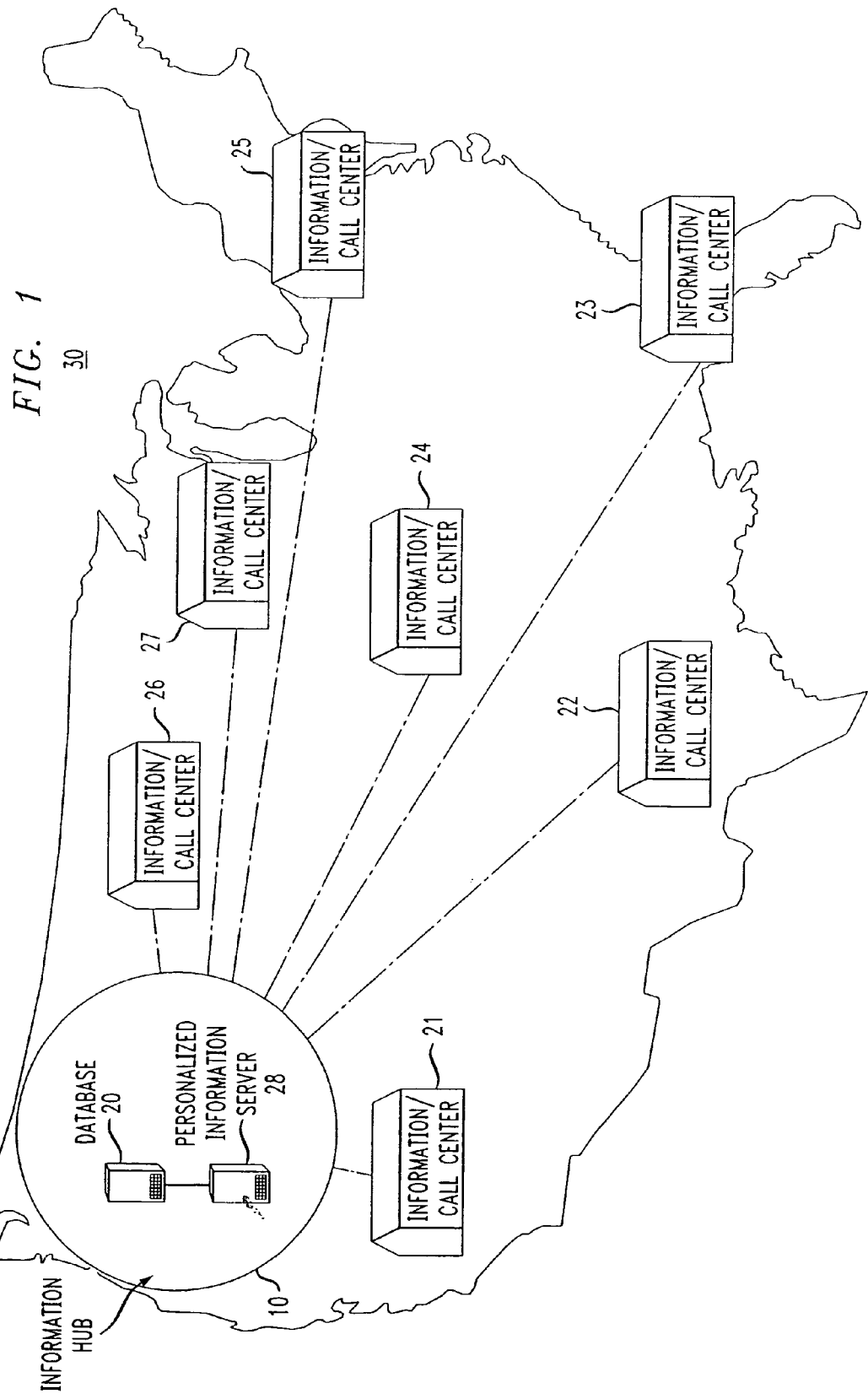
FIG. 1 illustrates a communications system including information/call centers in accordance with the invention.

The invention is directed to providing personalized information and communications services to users, e.g., telephone and mobile device users, especially when they are away from their "home" base where they normally conduct their business. An objective of the invention is to provide the users with personalized services comparable to those which are offered by the users' personal aides or secretaries. To that end, an information assistance service in accordance with the invention utilizes such information management tools as contacts folders (also known as private directories), appointments folders, to-do lists, user profiles, etc. to effectively communicate dynamic information to the users. The information assistance service in question provides not only traditional directory assistance, but also concierge-type services such as a restaurant guide and reservation service, event ticketing and reservation service, hotel reservation and availability service, travel or flight reservation and ticketing service, ordering specific items such as flowers or food delivery, arranging transportation, and accessing entertainment guides; geo/direction services such as providing directions to various places; sending invitations; administering appointments calendars; and conducting other transactions for the users.

To facilitate tailoring the information assistance service to individuals' specifications, one or more user profiles are maintained for a user, based on which the service is rendered to the user. For example, a user profile may specify the preferred method of handling his/her information assistance call, e.g., use of a special skilled operator, such as a Spanish speaking operator, to answer one such call. It may also define options of various assistance service features, e.g., the methods of delivery (e.g., e-mail, paging, SMS, etc.) of a confirmation of a reservation or purchase, a listing number, directions to the user, etc. In addition, in accordance with an aspect of the invention, the user may specify in the user profile a favorite information/call center(s) handling his/her information assistance calls. In that case, each information assistance call from the user is automatically routed to his/her favorite information/call center which may otherwise have been routed to some other center because of the call origination location or the call routing algorithm employed by the information assistance service.

For example, a user profile(s) in this instance may be maintained by the inventive information assistance service in association with an identifier of the user, e.g., the user's telephone number. When an information assistance call is received, the subject service locates any profiles of the caller's, e.g., based on an automatic number identification (ANI) associated with the call, which in a well known manner identifies the telephone number of the communications device from which the call originates. In an alternative embodiment, the caller's profile(s) may be determined by recognizing and identifying the caller's voice, with his/her "voice prints" stored in association with the profile(s).

It should be noted that the preferences in a profile may vary with time, and may be adjustable depending on different conditions. For example, preferences applicable to the daytime may be turned off in the evening, at which time another set of preferences may control. Similarly, preferences applicable to weekdays may be turned off on weekends in favor of a second set of preferences selected for weekends. Thus, by using the profile, the user is automatically provided with a personalized service, without the need of otherwise repeating the preferences, e.g., each time when calling an operator to obtain information and assistance. It should be pointed out that the term "operator" used herein broadly encompasses entities that are capable of providing assistance in a telecommunication environment, including without limitation human operators, voice response/recognition capabilities, web-enabled operator services, and other automated and electronic access.

In accordance with an aspect of the invention, a user may also specify in a user profile a selected period in which the telephone number associated with the user profile is "not in use," thereby achieving a temporary service disablement effect. In that case, any call originates from the telephone associated with the telephone number to the instant information assistance service would be turned away during the selected period. According to a further aspect of the invention, the selected period may correspond to an appointment or an activity, e.g., vacation, specified in a user appointments folder managed by the instance information assistance service. Thus, the inventive service disablement feature provides the user with the security of preventing others from using a particular telephone, e.g., a home telephone, to access the information assistance service, e.g., during his/her vacation.

The user profile may further specify the user's preferred types of events, areas of interest, food, goods, services, manufacturers, merchants and other personal preferences, e.g., preferred music, fashion, sports, restaurants, seating on a plane, sizes of jackets, etc. Based on such user profile information, the user may be targeted to receive certain advertising or promotional information. For example, before or after an information assistance call, such targeted promotional information may be "pushed" to the user, subject to any requirements in the profile. Alternatively, the inventive service may leave the user a message (e.g., voicemail, e-mail, etc.) containing the targeted promotional information at an address (e.g., voicemail access number, e-mail address, etc.) provided in the user profile, or may provide the user with information concerning an access to the same (e.g., WAP or web access with a specified uniform resource locator (URL)) on, say, the user's bill for the information assistance service. Of course, the user is allowed to opt out one or more of the above targeted advertising service features.

Other information may also be uploaded to the user profile such as account information, statuses of data synchronization between the aforementioned information management tools and user devices, statuses concerning orders and sales conducted through the instant information assistance service, etc. In addition, based on the sales and orders history, the user profile may keep track of the user's likes and dislikes, which help customize promotional information to be communicated to the user. The manner in which the information assistance service helps the user to consummate an order or sales, and the manner in which the user profile is revised from time to time to update the user criteria in selecting goods or services are described, e.g., in copending, commonly assigned U.S. application Ser. No. 10/318,847 ("the '847 Application") filed on Dec. 13, 2003, incorporated herein by reference.

In accordance with another aspect of the invention, services/menus offered to a user in the course of providing information assistance may be a function of the service device(s) (e.g., a wireless telephone with or without SMS or WAP capability) which the user is operating or has access to. The data concerning the capability of each service device or its service class may be specified in the user profile as well, which may be submitted by the carrier (e.g., AT&T Wireless) to which the user subscribes, volunteered by the user, or volunteered through the service device. For example, with the knowledge that the user's telephone is SMS enabled, an SMS coupon service may be provided to the user. With the knowledge that the user's telephone has graphics capability, an image of a street map may be transmitted thereto when the user requests directions from the information assistance service. As a result, the type of service offered to the user may vary with the type of service device. In accordance with a further aspect of the invention, the user may be charged for different services or features associated with the type of the service device used to communicate with the information assistance service. The service charges may vary with the different services or features offered. The user may be charged at a discount/premium rate depending on the actual service capability, class of service, and/or preferential status of the user. The services may also be bundled according to the device type.

In accordance with another aspect of the invention, security measures, e.g., a password, PIN, mother's maiden name, voice print and/or other biometric measure, are instituted to ensure that only an authorized user can access select services or groups of services associated, e.g., with the user's telephone number. For example, a user may specify a password in the user profile that if someone other than the user tries to access a select service, e.g., restaurant reservation, using the user's telephone, the password in the user profile needs to be verified.

FIG. 1 illustrates a communications system embodying the principles of the invention for providing, inter alia, a personalized information assistance service. This communication system includes wide area network (WAN) 30 covering an extensive area. WAN 30 may be an Internet-based network such as the World Wide Web or a private intranet based network. WAN 30 connects operators dispersed throughout a wide coverage area in information/call centers 21 through 27. One or more information hubs 10 are also included in WAN 30. An information hub 10 includes one or more personalized information servers 28 which are accessible by the operators in the system, and one or more databases 20 in which subscribers' information, and contacts, appointments, and other folders (e.g., to-do lists) may be stored and maintained. Such information and folders may also be stored locally at one or more of the information/call centers.

A user of the personalized information assistance service may want to create multiple contacts (appointments) folders for different purposes. For example, they may include a personal contacts (appointments) folder containing personal directory (calendar) information, and a business contacts (appointments) folder containing business directory (calendar) information. With the personalized information service, a contacts (appointments) folder may be created and maintained (1) through the Internet or other network or communications means directly, (2) through an operator indirectly, and/or (3) using a personal information manager (PIM). Well known PIMs include, e.g., hand-held devices such as personal digital assistants (PDAs) and wireless communicators; and computer devices such as notebook, laptop and desktop computers running software applications such as Microsoft Outlook, Outlook Express, Goldmine, Symantec Act!, Lotus Organizer and Lotus Notes. Other PIMs may include proprietary PIM systems and applications.

In case (3), by running a synchronization engine, the user may update any directory information which has been changed (added, edited or deleted) in a PIM data source in the corresponding contacts (appointments) folder, and vice versa. In case (2), the user may access a contacts (appointments) folder through communications with an operator at an information/call center via telecommunication media, e.g., wireless telephone, wireline telephone, voice over Internet protocol (VoIP), PDA, VPN, etc. The operator, as explained in more detail below, is generally provided with web browsing capabilities, telephone facilities as well as fully-featured operator user interface applications which facilitate the searching, retrieval and administering of database 20 through server 28.

Figure 2A:
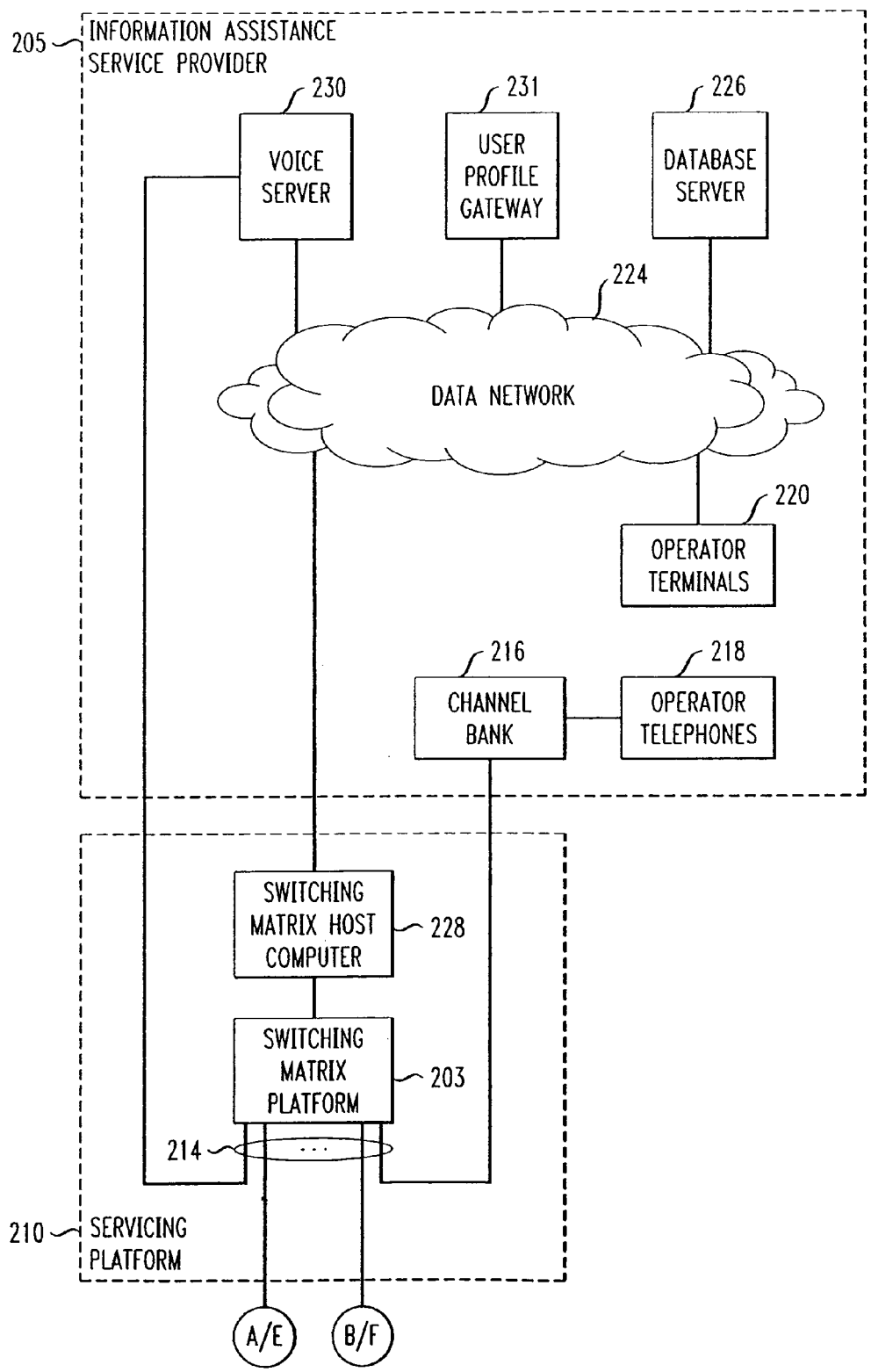
FIGS. 2A and 2B are block diagrams of components of the communications system of FIG. 1.
Figure 2B:
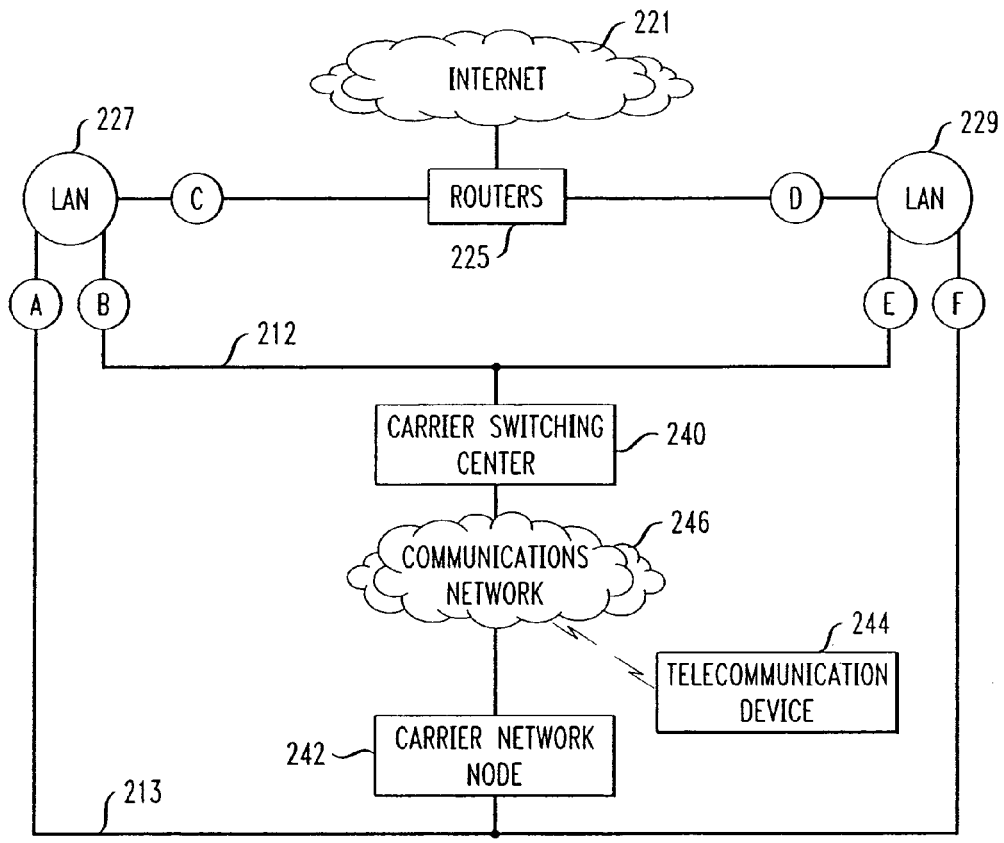

Referring to FIGS. 2A and 2B, information/call center 200 (which generically represents one of aforementioned information/call centers 21 through 27) is attended by operators, which includes information assistance service provider 205 and servicing platform 210. It should be noted that even though both provider 205 and servicing platform 210 appear in the same figure, they may or may not be located in the same geographic area. Servicing platform 210 comprises switching matrix host computer 228, and switching matrix platform 203 which is connected via T1 communication links 214 to, among others, voice server 230 and channel bank 216 in provider 205.

Channel bank 216 is used to couple multiple operator telephones 218 to platform 203. The operators in center 200 are further equipped with operator terminals 220, each of which includes a video display unit and a keyboard with associated dialing pad. Operator terminals 220 are connected over data network 224 to one or more database server(s) 226 (although only one is shown here). Database server 226 provides access to, among others, directory information from multiple sources. Database server 226 enables the operator to search directory information not just by name and address (sometimes city or area code) of a desired party, but also by type of goods/services and/or geographical region of a desired entity. Data network 224 further connects to voice server 230, user profile gateway 231, and switching matrix host computer 228, which in turn is connected to switching matrix platform 203 via a data link. Data network 224 includes, but is not limited to, local area network (LAN) 227, best seen in FIG. 2B. LAN 227 may connect to other similar remote LANs 229 to form WAN 30 in FIG. 1. LANs 227 and 229 are connected to one another and to Internet 221 via routers 225.

A user's telephone, computer, PDA or other telecommunication device 244 communicates via communications network 246 which is connected to carrier network node 242 and carrier switching center 240. T1 voice links 212 provide connection between the information/call center's switching matrix platform 203 and carrier's switching center 240, through which incoming information service calls are received. T1 voice links 212 further provide connection to the carrier switching center 240 through which outgoing calls are placed over communications network 246 (which network may be different than that used for incoming calls). Similarly, T1 data links 213 provide a signaling connection between the information/call center's node (not shown) and carrier network node 242, through which incoming and outgoing signaling messages are transported. The information/call center node is contained within switching matrix platform 203, but one with skill in the art will appreciate that the information/call center node could also be a physically distinct component. If the outgoing call is being placed over a different network than that on which the incoming call was received, a second data connection to the outgoing network will be established. The operation of switching matrix platform 203 is governed by computer-readable instructions stored and executed on switch matrix host computer 228. In this illustrative embodiment, platform 203 includes, inter alia, arrays of digital signal processors (DSPs). These DSPs can be programmed and reprogrammed to function as, among other things, call progress analyzers (CPAs), call progress generators (CPGs), multi-frequency (MF) tone generators/detectors, dual-tone multi-frequency (DTMF) generators/detectors, or conference units, depending on the demand placed on center 200 and platform 203 for each corresponding function.

Voice server 230 is connected via data network 224 to computer 228 (to which it acts as a slave processor) and via one or more T1 links to switching matrix platform 203. Each voice server 230 when more than one is employed in information/call center 200, connects to switching matrix platform 203 via a separate T1 link. Voice server 230 comprises a general purpose computer incorporating one or more voice cards, which serve as the interface between server 230 and the T1 span to switching matrix platform 203. One such voice card in server 230 monitors and controls communications over the T1 span. Its capabilities include telephone tone (e.g., DTMF or MF) detection and generation, voice recording and playback, and call progress analysis. Voice server 230 in this instance also contains a voice recognition device for receiving verbal input from a party connected thereto. Voice server 230 is employed to play the constantly repeated parts of an operator's speech, namely, the various greetings and signoffs (or closings), the caller's desired telephone number where requested, and possibly other information. At appropriate stages in a call progression, switch matrix host computer 228 initiates a voice path connection between voice server 30 and switching matrix platform 203 such that the user, or the user and the operator, are able to hear whatever pre-recorded speech is played on that connection by voice server 230. Computer 228 then instructs voice server 230, via data network 224, what type of message to play, and passes data parameters that enable voice server 230 to locate the message appropriate to the call state.

Users of a particular telephone carrier may dial, speak or otherwise communicate predetermined access digits, access codes or retail numbers, or input a predetermined address or a URL established for information assistance by that company. The instant example assumes that the user dials, e.g., "411," "*555," "555-1212," "1-800-555-1212," "00," or other designated access numbers. The participating telephone company's own switching system will then reroute the call to information/call center 200 (via a T1 channel), where it appears as an incoming call.

Automatic call distribution (ACD) logic is used to queue (if necessary) and distribute calls to operators in the order in which they are received, and such that the call traffic is distributed evenly among the operators. In other embodiments, other distribution logic schemes may be utilized, such as skills-based routing based on, e.g., a preferred call handling method specified by a user profile, or a priority scheme for preferred callers. The queue is maintained by switching matrix host computer 228.

As mentioned before, a user may create, maintain or access one or more contacts folders (or other folders such as a personal or company calendar folders) via the Internet or other network or communications means, or through an operator who in turn may create, maintain or access the folder on behalf of the user. In this illustrative embodiment, two contacts folders associated with the user, e.g., "My Contacts" and "Company Contacts" folders, are maintained and stored in database 20.

When the user uses telecommunication device 244, e.g., a wireless telephone, to call an operator at a designated access number for information assistance, the call is routed to, say, information/call center 200. After receiving the call, center 200 checks any user profile record associated with the user. In general, a user profile record is identified by a user's telephone number and maintained by a profile manager described below. Referring back to FIG. 2A, an information assistance call is received by switching matrix platform 203 in center 200. In a well known manner, platform 203 derives, from the call set-up signals associated with the call, an automatic number identification (ANI) indicating the telephone number of the communication device from which the call originates. Switching matrix host computer 228 then requests any user profile record identified by such an ANI from gateway 231 connected to data network 224.

Figure 3:
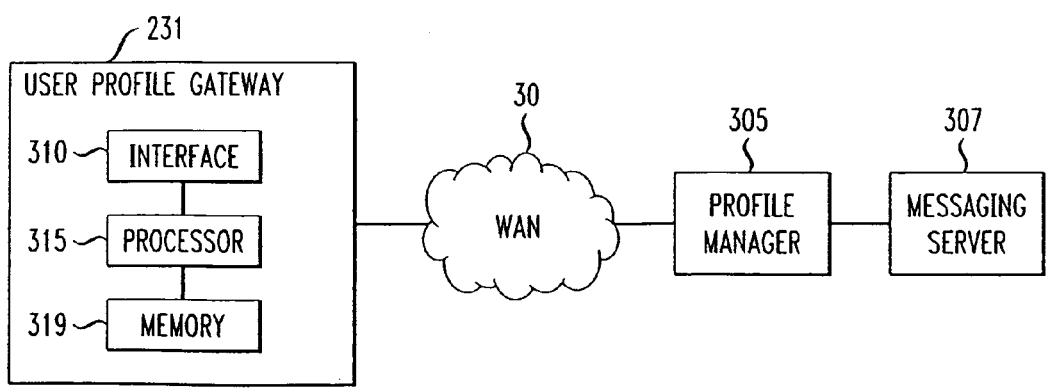
FIG. 3 illustrates an arrangement whereby an information/call center obtains a user profile record.

Referring also to FIG. 3, gateway 231 receives the profile record request including the ANI from data network 224 through interface 310. In response to such a request, processor 315 searches memory 319 for the profile record identified by the ANI. It should be noted at this point that all profile data is input and updated through profile manager 305. Copies of the profile records are distributed by manager 305 to the profile gateways in various information/call centers through WAN 30. In this illustrative embodiment, a master copy of the profile records is kept at manager 305. For example, profile gateway 231 initially forwards requests for new profile records to manager 305, and caches copies of the requested profile records from manager 305 in local memory 319 for rapid, subsequent retrieval of the profile records. Memory 319 here generically includes disks, caches, and volatile and nonvolatile memories. When a particular profile record in gateway 231 is updated at manager 305, the latter notifies gateway 231 that the particular profile record has expired. Thus, continuing the above example, if processor 315 determines that the requested profile record cannot be found in memory 319 or the requested profile record has expired, processor 315 forwards the profile record request to manager 305 through interface 310. In response, manager 305 provides to gateway 231 any latest profile record identified by the ANI. Otherwise, processor 315 retrieves from memory 319 any available, unexpired profile record identified by the ANI.

If processor 315 finds no user profile record in memory 319 and the response to the profile record request from manager 305 is negative, processor 315 informs manager 305 of the "profileless" status of the user. Otherwise, if processor 315 locates the latest user profile record, processor 315 reads the profile record to determine whether data about selected aspects of the user preferences in the profile record is missing or deficient, e.g., the preferred method of handling the instant information assistance call. If so, processor 315 informs manager 305 of the "profile data deficient" status of the user.

Figure 4:
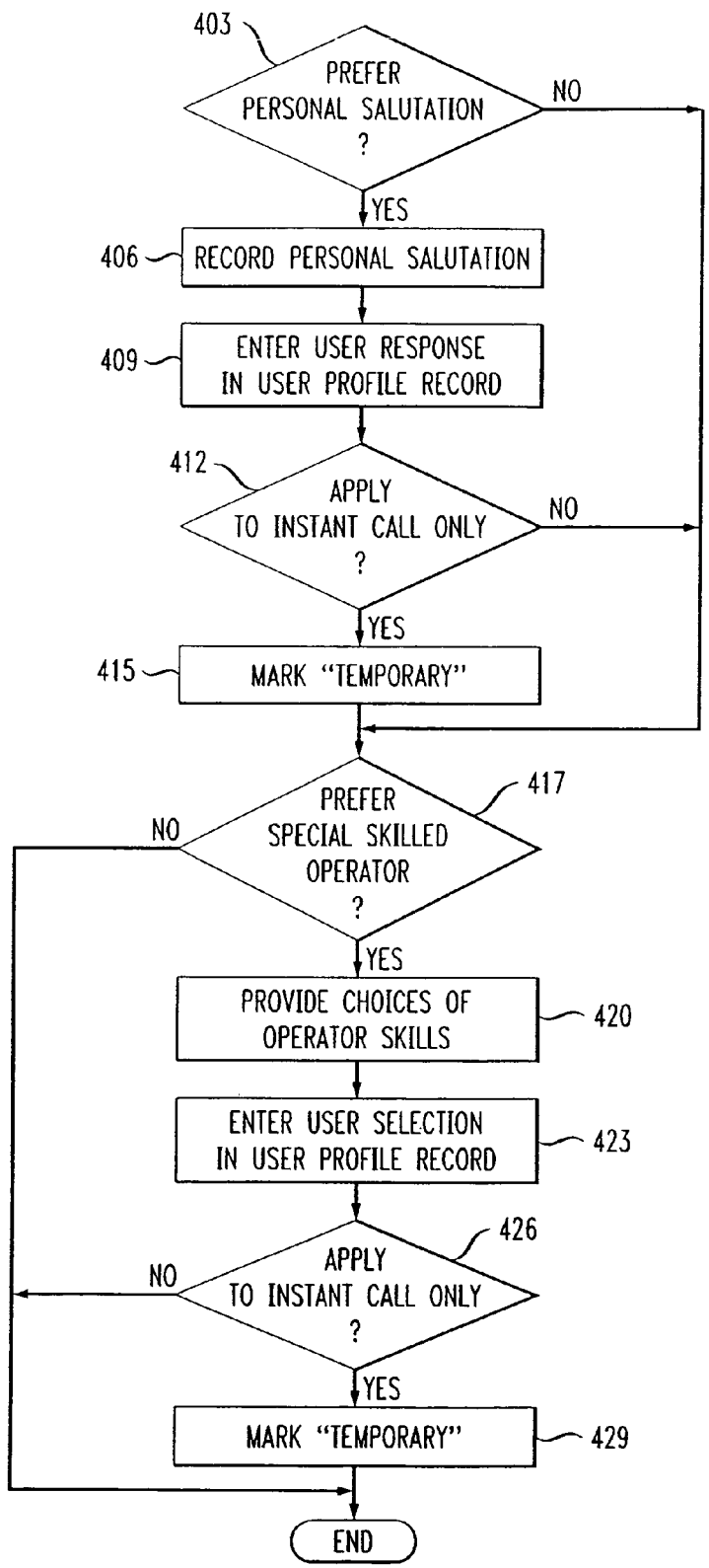
FIG. 4 is a flow chart depicting a routine for specifying user preferences concerning information assistance call handling.

Upon learning either the "profileless" or "profile data deficient" status of the user, manager 305 causes voice server 230 to seize the instant information assistance call, and elicit from the user data about his/her preferences to establish the user profile record or to supplement the same. For example, an important aspect of the user profile is the preferred method of handling an information assistance call, which is missing in this instance. FIG. 4 illustrates a routine for eliciting from the user data concerning such a call handling method. before the instant call is handled by an operator. At step 403, server 230 asks the user whether he/she prefers a personal salutation, e.g., Mr. Jay Smith, Dr. Smith, Jay, or simply Sir, or other nickname when an operator answers the call. If not, the routine proceeds to step 417 described below. Otherwise, server 230 at step 406 asks the user to record his/her preferred salutation, and becomes receptive to the user response. The user response is recognized, e.g., by the aforementioned voice recognition device in server 230, and at step 409 entered by manager 305 in the user profile record, which is newly established if no user profile record has been established for the user. Server 230 at step 412 asks the user whether the personal salutation preference applies to the instant call only or all calls, and becomes receptive to the user response. If such a preference applies to the instant call only, the profile entry is marked "temporary," as indicated at step 415, which is to be erased from the user profile record after the termination of the instant call. In that case, server 230 may again elicit from the user the personal salutation preference in a subsequent information assistance call by the user. However, in either case the routine proceeds to step 417. Otherwise, if the user does not have a personal salutation preference at step 406, the routine skips to step 417 as well, where server 230 asks the user whether he/she prefers a special skilled operator, e.g., a Spanish speaking operator, an operator who is local to New York City who is familiar with the New York lifestyle and local knowledge, etc. If not, the routine comes to an end. Otherwise, server 230 at step 420 provides choices of operator skills from which the user may select, and becomes receptive to the user selection. At step 423, the user selection(s) recognized by server 230 is entered in the user profile record. For example, server 230 may announce to the user in an automated voice, "press '1' if it pertains to a language skill; press '2' if it pertains to geographic region; etc. You may return to the menu for further selection by pressing '*'." Let's say the user presses "1" in this instance. Server 230 may further announce, "state the preferred language." In response, the user may then utter "Spanish." Similarly, server 230 at step 426 asks the user whether the special operator skill preference applies to the instant call only or all calls, and becomes receptive to the user response. If such a preference applies to the instant call only, the profile entry is marked "temporary," as indicated at step 429. Otherwise, the routine comes to an end.

In accordance with an aspect of the invention, a user may be able to select a preferred call/information center to handle his/her information assistance calls. Typically, an information assistance call is routed to an information/call center close to the call origination. In the case of a wireless communication user (e.g., a wireless telephone user) who travels, he/she may make an information assistance call anywhere within the service coverage, and thus the call origination point varies accordingly. As a result, a wireless communication user most likely experiences different information/call centers handling his/her information assistance call, which are geographically diverse. Even in the case of a wireline telephone user in, say, New York, N.Y., or a user having selected in the user profile record information/call centers in a preferred region, say, New York, N.Y., handling his/her information assistance call, such a call may still be routed to different information/call centers located in metropolitan New York, e.g., Long Island, N.Y.; Secaucus, N.J., etc.

Of course, before a user can identify which information/call center(s) he/she prefers, he/she must have some experience with certain information/call centers. When a user first signs on with the instant information assistance service, he/she will not know which information call center(s) he/she prefers, as he/she will not have had experience with any of the centers. In this event, the user can simply use the service for some period of time without the preferred information/call center feature, and can notify the instant service provider when he/she has identified one or more information/call centers he/she prefers.

In an embodiment of the invention, at the end of each interaction the user has with an information/call center (e.g., after the operator disconnects from the call but before the caller is either transferred to the destination party or the system disconnects from the call), voice server 230 is programmed to ask the user to rate the center on a scale from 0 to 9, 9 being the best. The user makes his/her selection by pressing the corresponding key on his telephone keypad, and the system records the center ratings. After the user has been sufficiently exposed to many information/call centers, the service provider can inform the subscriber how he/she has ranked the different centers, and, based on this information, the user can then select which center(s) he/she would like in his/her preferred pool. Of course, the user is free to add or delete a center from his/her preferred pool at any time, or can decide anytime which center(s) he/she would like in his/her preferred pool.

This aspect of the instant invention, which has the additional advantage of allowing the ratings given by different users to each information/call center to be accumulated, saved and used by the provider of the instant service for purposes of evaluating the performance of its centers. The subscriber first advises the service provider that he/she wishes to begin using the preferred call/information center feature. The user can advise the service provider of this fact in a number of ways, including a standard call for service to the service provider, a call to the service provider via a special telephone number provided by the service provider for account status/update calls and the like, or by mail, e-mail, fax, pager or other communications media, all of which are within the scope of the instant invention. The user profile is then updated to indicate that he/she is a new preferred information/call center user.

Thereafter, when the user is connected to the service provider for information assistance service (step 574 in FIG. 5), computer 228 will first check the user profile to determine if the user is an established preferred information/call center user, i.e., a user whose preferred centers have already been determined (step 576). In a preferred embodiment, computer 228 identifies the subscriber by his/her telephone number which corresponds to the ANI provided in a call stream to platform 203 in a well known manner when the user's call is first routed thereto, although other ways of identifying the user are also within the scope of the invention.

There will be times when it will not be possible to automatically identify the user, or when it will otherwise be preferable for the user to provide identity information himself/herself (e.g., for security purposes). In this event, computer 228 will prompt the user, e.g., via voice server 230, to provide information from which he/she can be identified. Identity information can be provided by the user by pressing the keys of his/her telephone keypad; a user ID, for example. The user may also (or alternatively) be given the option of speaking to provide identity information. For example, computer 228 may use voice print or speaker verification technologies to verify the user's identity not by what he/she said but rather by the characteristics of his/her voice.

If the user is an established user, computer 228 in step 578 determines whether the current information/call center having received the call is the user's most preferred center as specified in the user profile. If so, the current center processes the call instantly, as indicated in step 580. Otherwise, platform 203 in step 582 attempts to route the call to the user's most preferred center; if such an attempt fails (e.g., the calls at the most preferred information/call center are overflowing) and the user has more than one preferred center, platform 203 attempts to route the call to the second most preferred center; so on and so forth until the pool of the preferred centers is exhausted. The current center would also process the call if each attempt to route the call to a preferred center fails.

If the user is not an established user, meaning a user who has expressed the desire to use the preferred center feature but has not yet had his/her preferred center(s) identified, the current information/call center having received the call processes the call in a conventional manner, as indicated in step 584. At the end of the interaction with the current center, the user is prompted to enter his/her rating of the current center, as indicated in step 586. The user's call center utilization history, represented by FIG. 6, is then updated in step 588.

Figures 5, 6:
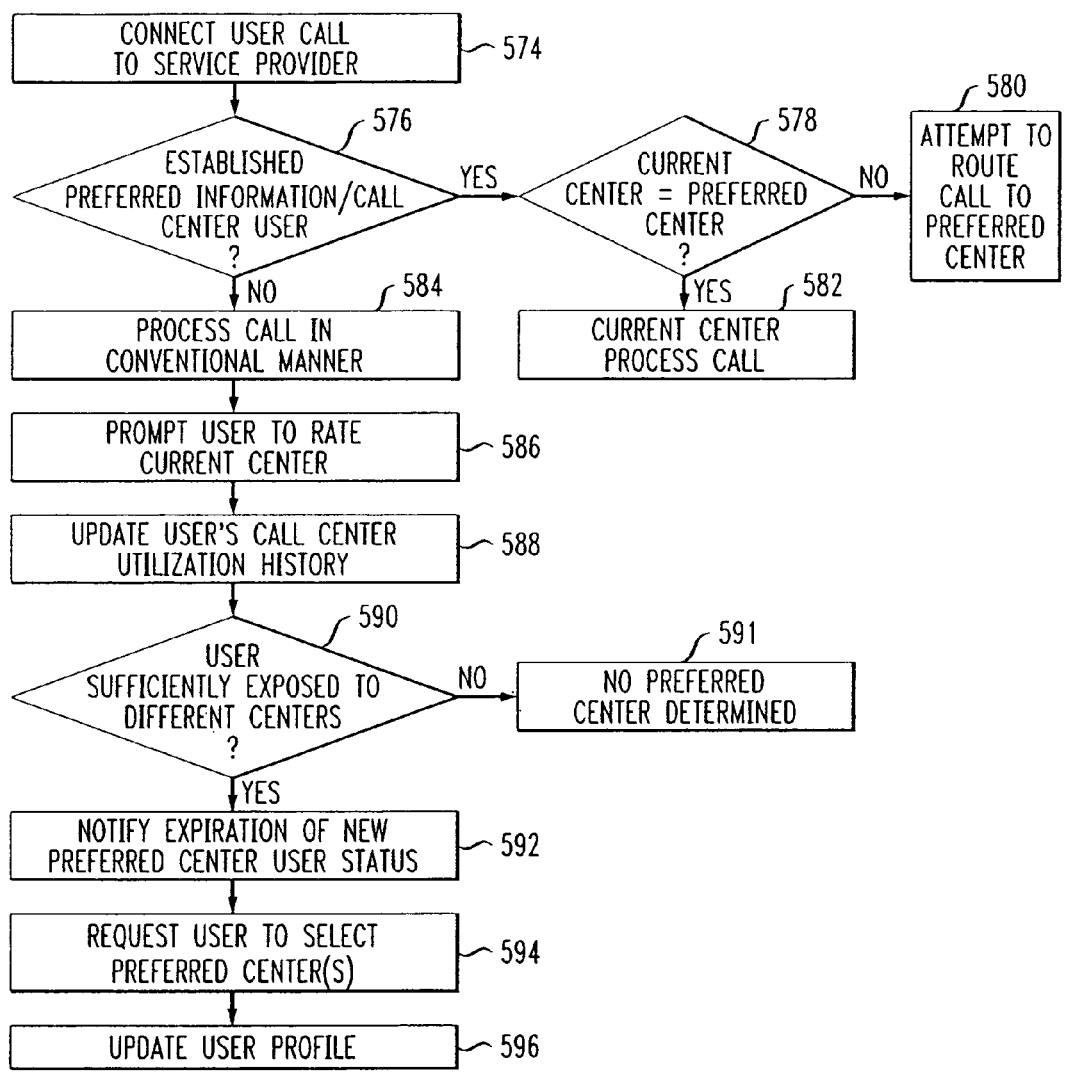
FIG. 5 is a flow chart depicting a routine for routing an information assistance call based on a user's preferred information/call center(s), in accordance with the invention.
FIG. 6 is a table for tracking the user's rating of information/call centers in determining the user's preferred center(s)

The first column of FIG. 6 contains the identifiers (e.g., alphanumerical) identifying the information/call centers, e.g., NY1011, NY1023, etc., having processed the user's calls. The second column of FIG. 6 contains the number of times the user's call has been processed by each center since the user has been a new preferred information/call center user. The third column contains an average of the ratings that the user has given to each center. The history of FIG. 6 may be stored within the user's profile, although those skilled in the art having the benefit of the instant disclosure will appreciate that there are a number of ways this information can be stored to achieve the advantages of the instant invention, each of which is within the scope of the instant invention.

In the example of FIG. 6, because the user rated center NY1011, as a "0" on two previous interactions with that center, computer 228 (or the user) may decide no further calls from the instant user should be processed by center NY1011, even though the user is still a new preferred center user and has not yet selected his/her preferred centers. In step 590, computer 228 determines if the user has been sufficiently exposed to different information/call centers. This decision can be made by reviewing the history of FIG. 6 to see if he/she has interacted with different centers for some predetermined number of times, or by any other criteria as determined by the service provider, the user, or both.

If the user has not been sufficiently exposed to different information/call centers, no preferred center is determined (step 591) until perhaps the next time the user calls for service. Otherwise, the user is notified in step 592 of the expiration of his/her new preferred center user status, as well as of the rankings that the user has given to the different centers he/she has interacted with. The user is then requested to select his/her preferred center(s) in step 594. This interaction between the service provider and the user can occur via any of the communications methods described above. Finally, in step 596, computer 228 updates the user profile to indicate that the user is now a preferred information/call center user, along with the identity of the user's preferred center(s).

FIG. 7 illustrates profile record 500 associated with the user in this instance. Record 500 contains user preferences including information concerning the user's subscription to enhanced services or features, e.g., preferred information/call centers feature option 522, personalized information management service option 512 maintaining the aforementioned contacts, appointments and other folders for the user. Record 500 is updated from time to time when one or more user preferences are changed, and in particular each time when the user subscribes to a new enhanced service or cancels an enhanced service subscription. In addition, record 500 in this instance indicates personal salutation preference 514 and special operator skill preference 516 specified by way of the routine of FIG. 4, and information/call center preference 518 specified by way of the routine of FIG. 5.

Figure 8:
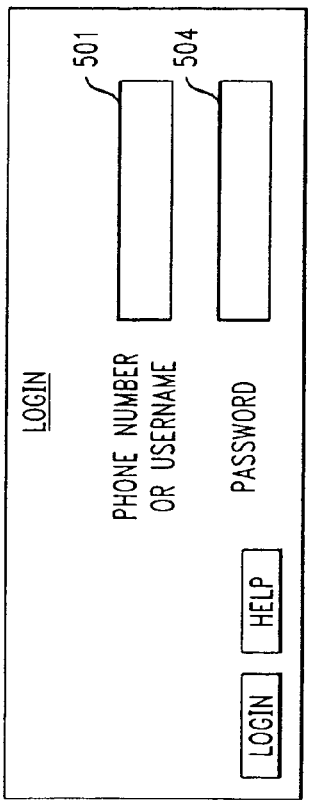
FIG. 8 illustrates a Login graphical user interface (GUI) in accordance with the invention.

For example, knowing from record 500 that the user is a subscriber to the personalized information management service, computer 228 may communicate the received ANI to personalized information server 28 through WAN 30 (or alternatively Internet 121). In response, server 28 presents a Login graphical user interface (GUI) on terminal 120, at which an operator is currently attending to the user's information assistance call. FIG. 8 illustrates such a GUI where the operator is prompted to enter the user's phone number or username to identify the user, and a password to verify that the user is authorized to access the personalized information management service. It will be appreciated that other user identifying information, e.g., a PIN, mother's maiden name, voice print, etc. may be used for verification purposes as well.

It should be noted at this point that the user identification and password are established beforehand through a registration process. For example, to subscribe to the personalized information service, the user can call an operator at the designated access number. As part of the registration, the operator enters in a user data record on server 28 the user identifying information including username, password, and telephone number of the particular telecommunication device, e.g., a wireless telephone in this instance, which the user would use to call the information assistance service in the future. It is particularly advantageous to use such a phone number (also known as a mobile directory number (MDN) in the case of a wireless phone number) to identify the user since, as described before, the calling number would be automatically captured as an ANI at information/call center 200 when the user calls.

Thus, the ANI of the user is automatically provided in entry 501 of the Login GUI by server 28, thereby obviating the need of the operator's eliciting from the user, and entering, the required phone number or username. At entry 504, the operator enters the password provided by the user to complete the login process. In the event that the ANI is not automatically available, or where the user is accessing the subject service from an unknown point or the operator suspects that the user calls from a phone number other than the registered phone number, the operator may verify/obtain the necessary identifying information with/from the user. For that matter, in an alternative embodiment, the user data record may also contain biometric measures for user identification, e.g., voice prints of the user, which may be derived from a recording of the user uttering a pre-selected code(s) (e.g., PIN) or word(s) (e.g., password) during the registration process. In that embodiment, when the user subsequently attempts to access the personalized information service, the user needs to utter the pre-selected code(s) or word(s). Only when his/her utterance corresponds to the stored voice prints, should he/she be allowed the service access.

The login information is transmitted to server 28, where it checks the aforementioned user data record to verify the received information. After it is verified, server 28 identifies from the user data record all of the folders including contacts folders and appointments folders associated with the login information (e.g., the ANI), and any user's access rights thereto. For example, for each folder, the user may have the predesignated rights to view, edit, administer, and/or delete the folder. Server 28 presents to terminal 120 a Home GUI, listing all such folders associated with the ANI and thus the user.

Figure 9:
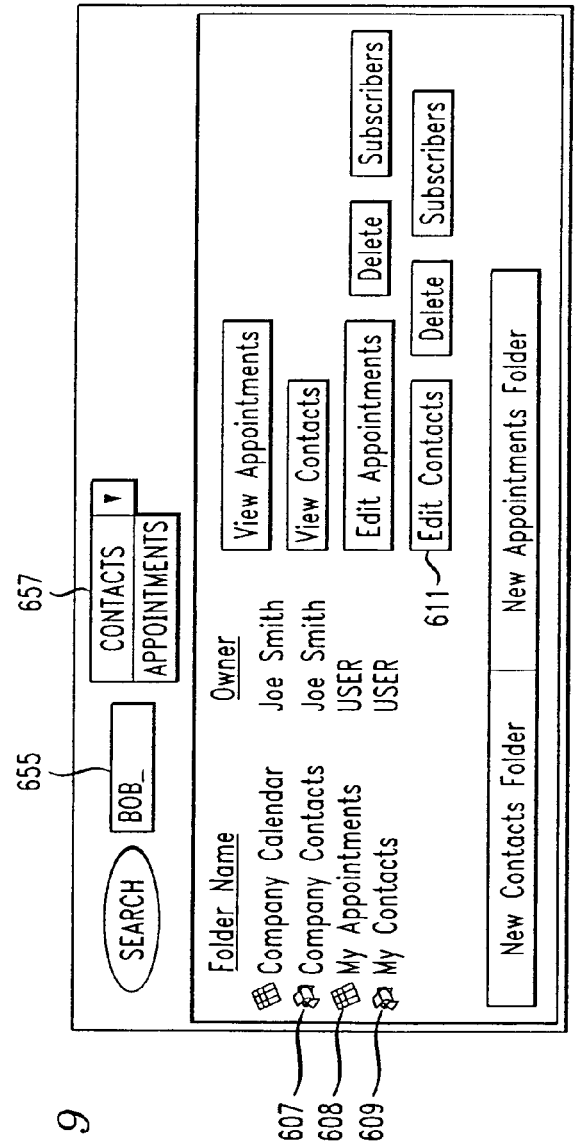
FIG. 9 illustrates a Home GUI in accordance with the invention.

FIG. 9 illustrates such a Home GUI, which lists, among others, contacts folders 607 and 609 designated "Company Contacts" and "My Contacts," respectively. The operator can access each contacts folder, and manage the contacts information in the folder for the user, subject to the user's access rights thereto. For example, the user in this instance has the predesignated right to view the content of Company Contacts folder 607 only. On the other hand, he/she has the additional right to edit the content of My Contacts folder 609.

FIG. 10 illustrates a GUI showing the content of My Contacts folder 609 when, say, Edit Contacts option 611 is selected. As shown in FIG. 8, for each contact, e.g., Bob, his/her name, home phone number, business phone number and mobile phone number, if any, although additional information concerning the contact, e.g., his/her postal and electronic mail addresses, may be available but is not displayed for lack of room. For that reason, a More option, e.g., option 705, is provided for selection to present the additional information on a separate screen.

In addition, for each contact an Edit option, e.g., option 707, is provided to edit the contact information. For instance, when option 707 is selected, server 28 returns another GUI, which is illustrated in FIG. 11. At this GUI, different fields concerning the contact Bob, e.g., his name, company name, company address, phone numbers, facsimile numbers and pager numbers are presented, and each field may be modified by overwriting any existing information therein.

It should be noted that to protect privacy of certain information about a contact, e.g., his/her home phone number, an owner or administrator of folder 609 is afforded Private options, e.g., option 807, to designate certain contact information private. Accordingly, server 28 exercises censorship on contact information in a folder based on any privacy protection previously imposed by the owner or administrator of the folder. As shown in FIG. 11, the privacy protection is on an element by element basis. For example, Private option 807 in this instance is selected to keep Bob's home phone number private while the Private option for his business number is unselected, which is therefore unprotected from the public. Thus, in this instance, a read-only subscriber to folder 609 who is not privy to Bob's home phone number may learn his business number. As a result, when a read-only subscriber views a listing of the contacts including Bob in folder 609, his home phone number is replaced by a "Private" notice.

In accordance with an aspect of the invention, the read-only subscriber to folder 609 may still be connected to Bob's home phone number by the operator, but will not be provided with the number dialed. To that end, after the read-only subscriber calls an operator and requests to be connected to Bob, the operator goes through the similar Login and Home GUIs which however pertain to the read-only subscriber. By utilizing the search engine described below, the operator uncovers listing 912 in a View GUI illustrated in FIG. 12.

It should be noted that this View GUI which is made available to a read-only subscriber (represented by the operator in this instance) to folder 609 is similar to the Edit GUI of FIG. 10 which is made available to an owner or administrator of the folder. However, the two GUIs differ from each other in that unlike the Edit GUI, the View GUI lacks Edit options since a read-only subscriber to folder 609 does not possess edit rights. In addition, Bob's home number, designated private, is revealed on the Edit GUI to the owner or administrator of folder 609, but not on the View GUI. Thus, in this instance, the operator is faced with the same "Private" notice in lieu of Bob's home phone number on the View GUI as would be the case if the read-only subscriber accesses the View GUI on his/her own. In order to connect the read-only subscriber to Bob's home number, the operator at terminal 220 signals switching matrix platform 203 to place the read-only subscriber's call on hold, and selects the "Private" notice. This selection causes an identification (ID) of the subscriber's connection which is on hold, and a request for Bob's home number in folder 609 to be sent to server 28. In response to such a request, server 28 retrieves Bob's home number in folder 609 from database 20, and transmits another request for connecting the subscriber to the retrieved phone number to switching matrix host computer 228 via WAN 30. This request includes the aforementioned subscriber's connection ID. Under control of computer 228, platform 203 then calls Bob's home phone number to establish a connection thereto. Once the new connection is established, computer 228 causes platform 203 to bridge the subscriber's connection identified by the received ID to the new connection, thereby connecting the subscriber to Bob's home number, without disclosing the number to the subscriber, or the operator for that matter.

In an alternative embodiment, the operator plays an active role before the subscriber's connection is bridged to the connection to Bob's home number. In this embodiment, the operator obtains from the user data record the subscriber's name as registered. However, the operator may also verify the subscriber's name with the subscriber verbally before putting the subscriber's connection on hold. As soon as platform 203 establishes the connection to Bob's home number, the operator is afforded an option to ask Bob over the newly established connection whether Bob wants to talk to the read-only subscriber. If Bob accepts the call, the operator signals host computer 228 to cause platform 203 to bridge Bob's connection to the subscriber's connection, thereby connecting the subscriber to Bob's home number. Otherwise, if Bob declines to talk to the read-only subscriber, the operator informs the subscriber of the declination and causes platform 203 to terminate (or tear down) both connections with Bob and the subscriber.

In another alternative embodiment, voice server 230 takes the place of the operator in asking Bob whether he wants to answer the subscriber's call. That is, before the subscriber's connection is bridged to Bob's connection, voice server 230 seizes Bob's connection and announces in an automated voice, over the connection, an arrival of the call from the subscriber who is identified by his/her registered name. After learning the identity of the subscriber, Bob is afforded a choice to accept the call by pressing a first predetermined key on his telephone. The resulting DTMF signal causes platform 203 to bridge the subscriber's connection to Bob's connection. Otherwise, Bob may press a second predetermined key to reject the call. The resulting DTMF signal causes (a) voice server 230 to announce to the subscriber, through the subscriber's connection, Bob's declination to answer the call, and (b) platform 203 to terminate both Bob's and the subscriber's connections.

In yet another alternative embodiment, the screening of the subscriber's call is achieved by using an improved caller ID (CID) feature in accordance with the invention. Traditionally, by subscribing to a CID service and utilizing a CID receiver, which may be integrated into a telephone, a called party between phone rings may receive display CID information on the receiver which includes the originating telephone number, name associated with that number, date and time of the call. One such receiver for receiving CID information is described, e.g., in U.S. Pat. No. 4,582,956 issued to Doughty on Apr. 15, 1986.

The CID information is transmitted from a switching office connected to the called party's CID receiver using frequency shift keyed (FSK) modem tones. These FSK modem tones are used to transmit the display message in ASCII character code form. The transmission of the display message takes place between the first and second rings of the called station. The CID data format and transmitter are described, e.g., in U.S. Pat. No. 4,551,581 ("the '581 patent") issued to Doughty on Nov. 5, 1985. As described in the '581 patent, the data format of each message to be sent to the called station is preceded by the specification of the type and length of the message. For example, for the first message concerning the originating number, the first character sent is the message type which specifies that the ensuing message is an originating number. The second character represents the length of the message. After the message length character are characters which represent the digits of the originating number. Additional messages follow the same data format (i.e., type character, length character and message content in that order). The formatted messages are followed by a checksum or other error detection character which is used to detect errors which may have been introduced in the transmission.

However, we have recognized a few disadvantages of using the traditional CID service. For example, any name which appears in the CID alongside the originating telephone number identifies the telephone service subscriber to that number, and which is registered by a telephone carrier in a directory database, also known as "white pages." Telephone carriers typically have directory listings of wireline telephone service subscribers but currently lack the listings of wireless telephone service subscribers. As a result, when a caller uses a wireless telephone to call a called station, the CID receiver at the called station typically displays the wireless telephone number, but not the name of the associated telephone service subscriber because of a lack of the white pages information. As such, the traditional CID service is ineffective in screening wireless calls by the callers' name.

Return now to the above example where the caller, who is a read-only subscriber to contacts folder 609, asks an operator to connect him/her to Bob's home number which is indicated "Private" in the folder. Not to be confused with a telephone service subscriber, the folder subscriber in this example will now be referred to simply as the "caller." When the caller calls the operator for connecting him/her to Bob's home number, the ANI associated with the caller's call is communicated to center 200 which, as mentioned before, is derived by platform 203 from the call set-up signals. In accordance with an aspect of the invention, the white pages information associated with such an ANI is provided as CID data to Bob for call screening purposes. To that end, host computer 228 provides the ANI to database server 226 to look up the corresponding white pages information. It should be noted that unlike a typical telephone carrier, call/information center 200 in this instance has access to directory listings of both wireline and wireless telephone service subscribers. Thus, based on the received ANI, server 226 locates the directory listing including the name of the telephone service subscriber associated with the ANI. While the connection with the caller is on hold, and the second connection to Bob's home number is being established, host computer 228 in accordance with the invention communicates, as part of the call set-up procedure, the ANI and associated telephone service subscriber name to the called station (i.e., Bob's telephone) as the CID data. Specifically, such ANI and associated telephone service subscriber name are formatted in the well known CID data format and communicated, pursuant to an agreed-upon protocol, to the aforementioned data transmitter in the switching office connected to the called station.

FIG. 13 illustrates the ANI and associated telephone service subscriber name in the CID data format. As shown in FIG. 13, type character 715 specifies that the ensuing message contains the telephone number of the calling station from which the caller calls the operator. Length character 718 specifies the length of such a telephone number. Message field 721 contains the actual telephone number of the calling station, i.e., the ANI. In addition, type character 724 specifies that the ensuing message contains the telephone service subscriber name associated with the telephone number in field 721 according to the directory listing. Length character 727 specifies the length of such a name. Message field 730 contains the actual telephone service subscriber name. Following field 730 is checksum field 733 for detection of transmission errors.

In a well known manner, the data transmitter in the switching office transmits the CID data between rings of the called station, which is displayed on the called station or other connected device for receiving such CID data. As soon as the connection to the called station is established, host computer 128 causes platform 114 to bridge the new connection to the caller's connection which is on hold. Bob may then review the resulting CID display information at the called station before he decides to answer the call or not.

However, we have recognized that in the above example, the caller may not always be the same as the telephone service subscriber to the originating number because the caller may have borrowed another person's telephone to call. As a result, the CID message indicating the name of the telephone service subscriber may be misleading in identifying whom the caller is. Thus, in accordance with a second aspect of the invention, after obtaining the white pages information based on the ANI in the above example, the operator checks the name associated with the ANI in the directory listing against the caller's name as registered on the user data record. If they do not match, the operator may assume that the caller's name from the user data record is valid as the associated password of the caller was verified in the earlier login process. However, the operator may also verify the caller's name with the caller on the phone. The operator then enters the actual caller's name on terminal 220, which replaces the telephone service subscriber name in the CID data to be transmitted to the called station. FIG. 14 illustrates the resulting formatted CID data, which differs from that of FIG. 13 in that type character 741 and length character 743 in FIG. 14 correspond to the caller's name, as opposed to the telephone service subscriber name. In addition, message field 745 contains such a caller's name.

We have also recognized that with the caller's name ascertained in the above example, the calling station number in the CID data serves no additional identification purpose. However, it may provide a means for the called party to return the caller's call. For instance, upon reviewing the CID display information, Bob may decide not to answer the call immediately as he is unavailable or currently on another call. Bob may try to contact the caller later using the display calling station number. Nevertheless, by the time when Bob calls, the caller may not be at that number, or the caller may want Bob to return his/her call at a different number or by a different method of communications altogether, e.g., facsimile, email or SMS. Thus, in accordance with a third aspect of the invention, the operator may query the caller on the phone for methods of returning his/her call in case Bob does not answer the call immediately. In this instance, let's say the caller wants Bob to return his/her call using a telephone number different from the current calling number, or via facsimile or email. In that case, the caller provides the operator with his/her desired (1) call-back telephone number, (2) facsimile number and (3) email address. Accordingly, the operator enters on terminal 220 the information concerning the call-return methods, along with the caller's name, to generate the CID data to be transmitted to the called station. The resulting formatted CID data by host computer 228 is illustrated in FIG. 15, which includes additional type character 751 and length character 753 correspond to the call-back telephone number, which is contained in message field 755; type character 757 and length character 759 correspond to the caller's facsimile number, which is contained in message field 761 and may be preceded with "F-" to be distinguished from a telephone number; type character 763 and length character 765 correspond to the caller's email address, which is contained in message field 767. Of course, the time period for which each method of communications is the most convenient to the caller may also be specified in the CID data.

Figure 18:
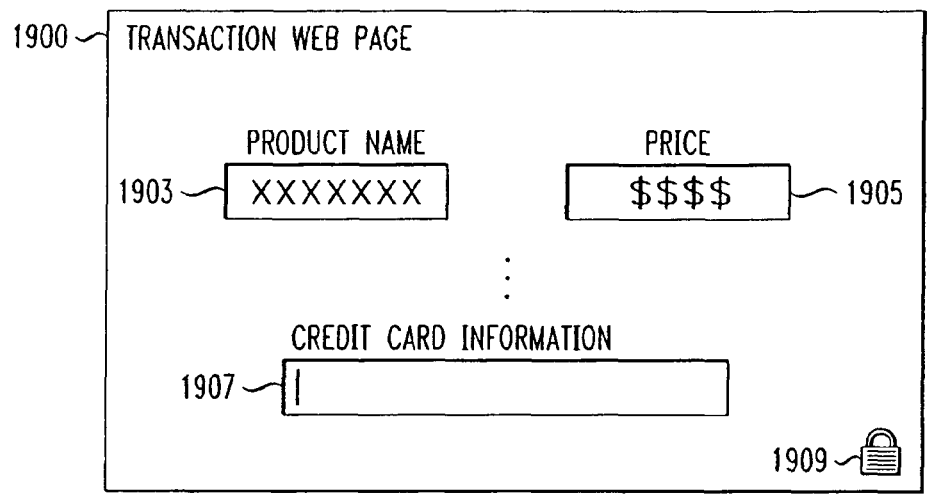
FIG. 18 illustrates a transaction web page for an entry of confidential information, in accordance with the invention.

Further, we have recognized that the caller's name in the CID display may not be sufficient information for the called party to decide to answer the call. The purpose of the call, or the subject of the call may be important as well. For instance, Bob in the above example would answer the call if it concerns a business meeting the next day whereas he would not if it concerns an upcoming social event, even though the caller is the same in each case. Thus, in accordance with a fourth aspect of the invention, the operator, when querying the caller for the call-return methods, may also query the caller for the purpose or subject of the call, or other CID message to be shown to Bob. For example, the caller may want to confirm the meeting with Bob at 10 a.m. tomorrow. In that case, a CID message such as "See you tomorrow at 10" is sufficient to confirm the meeting. In implementation, the CID message may be abbreviated to accommodate the limited number of characters allowed. Thus, upon reviewing such a CID message while the called station is ringing, Bob may choose not to answer the call if he is satisfied with the message, or to pick up the call if he wants to talk to the caller, e.g., to change the meeting schedule or for whatever reasons. Thus, in this illustrative embodiment, the operator also enters on terminal 120 the call-content attribute of the call (e.g., information concerning the call purpose or subject), or any desired message from the caller to generate the CID data to be transmitted to the called station. The resulting formatted CID data is illustrated in FIG. 18, which includes additional type character 771 and length character 773 corresponding to the call-content attribute and/or desired message from the caller, which are contained in message field 775. By reviewing the display CID information at the called station which includes the call-content attribute and/or caller's message in this instance, Bob is able to make a better informed decision whether to answer the call.

The user may subscribe to or opt out the above-described CID service. The subscription to or opting out the CID service may be specified in user profile record 500. For example, referring to FIG. 7, caller-ID service option 520 in this instance is unselected, indicating its opt-out status.

Referring back to FIG. 11, the above-described concept of protecting privacy of listing information on an element-by-element basis is applicable not only to contacts folders here, but also generally to white pages, wireless telephone directories, enterprise directories and other public directories. In particular, all wireless telephone numbers currently are unpublished. The disclosure of a wireless telephone number may be opted in or out, e.g., by selecting or unselecting Private option 809.

A selection of one such Private option (associated with wireline, wireless, or other user telephone number) may lead to queries for desired privacy features. For example, the user may choose to disclose the telephone number during certain times (e.g., daytime, weekdays), and no other telephone number or a second telephone number during other times (e.g., nighttime, weekends). In addition, the user may create a "blackout list," listing those entities (by their names and/or telephone numbers) which are unauthorized to obtain the user telephone number. In that case, for example, the blackout list may be stored in database 20 in association with the user telephone number. When a caller calls the information assistance service to access the user telephone number, the service provider may retrieve the user telephone number, along with the associated blackout list. The service provider may then screen the caller to determine whether the caller is authorized to access the user telephone number. Such screening may be conducted manually by an operator where the operator may check the ANI associated with the call against the blackout list, or may simply ask for the caller's name, his/her company name, or other affiliation information, and check the received identity information against the blackout list. The screening may alternatively be conducted by computer 228 in an automated manner where upon learning the ANI associated with the call, computer 228 checks the ANI against the telephone numbers on the blackout list.

In another embodiment, the user may provide the caller a PIN beforehand, which is required to be produced by the caller during an information assistance call to access the user telephone number. Like the aforementioned blackout list, the PIN may be stored in database 20 in association with the user telephone number. The PIN may similarly be verified by the information assistance service provider manually or in an automated manner before the caller can access the user telephone number. Further, the user may have multiple PINs associated with different privacy levels, respectively. Each privacy level is used to qualify the restriction of access to listing information. For example, a first PIN is associated with privacy level 1, production of which by a caller during an information assistance inquiry may enable the caller to access the user's business telephone number; a second PIN is associated with privacy level 2, production of which by a caller during an information assistance inquiry may enable the caller to access the user's home phone number in addition to his/her business telephone number; a third PIN is associated with privacy level 3, production of which by a caller during an information assistance inquiry may enable the caller to access the user's wireless telephone number in addition to his/her business telephone number and home phone number; and so on and so forth. Thus, with the above inventive privacy measures, the information assistance service provider advantageously serves as a clearing house to allow proper parties to access appropriate portions of listing information.

Referring back to FIG. 9, a search engine is provided on a Home GUI to search for a listing of a desired contact. For example, the operator may specify at entry 655 a search term (e.g., Bob), and select at entry 657 the type of folder (e.g., contacts or appointments) in which the search term is to be found. Thus, by using such a search engine, an informal request without much information, such as "I need to reach Bob" and "I want to talk to the sales manager at ABC Corporation" is sufficient for the operator to locate the requested contact information. After initiating the search by clicking on the "Search" button, any listing satisfying the search query is highlighted. In this instance, a search on the name "Bob" in a contacts folder uncovers listing 712 in the Edit GUI of FIG. 10.

Figure 17:
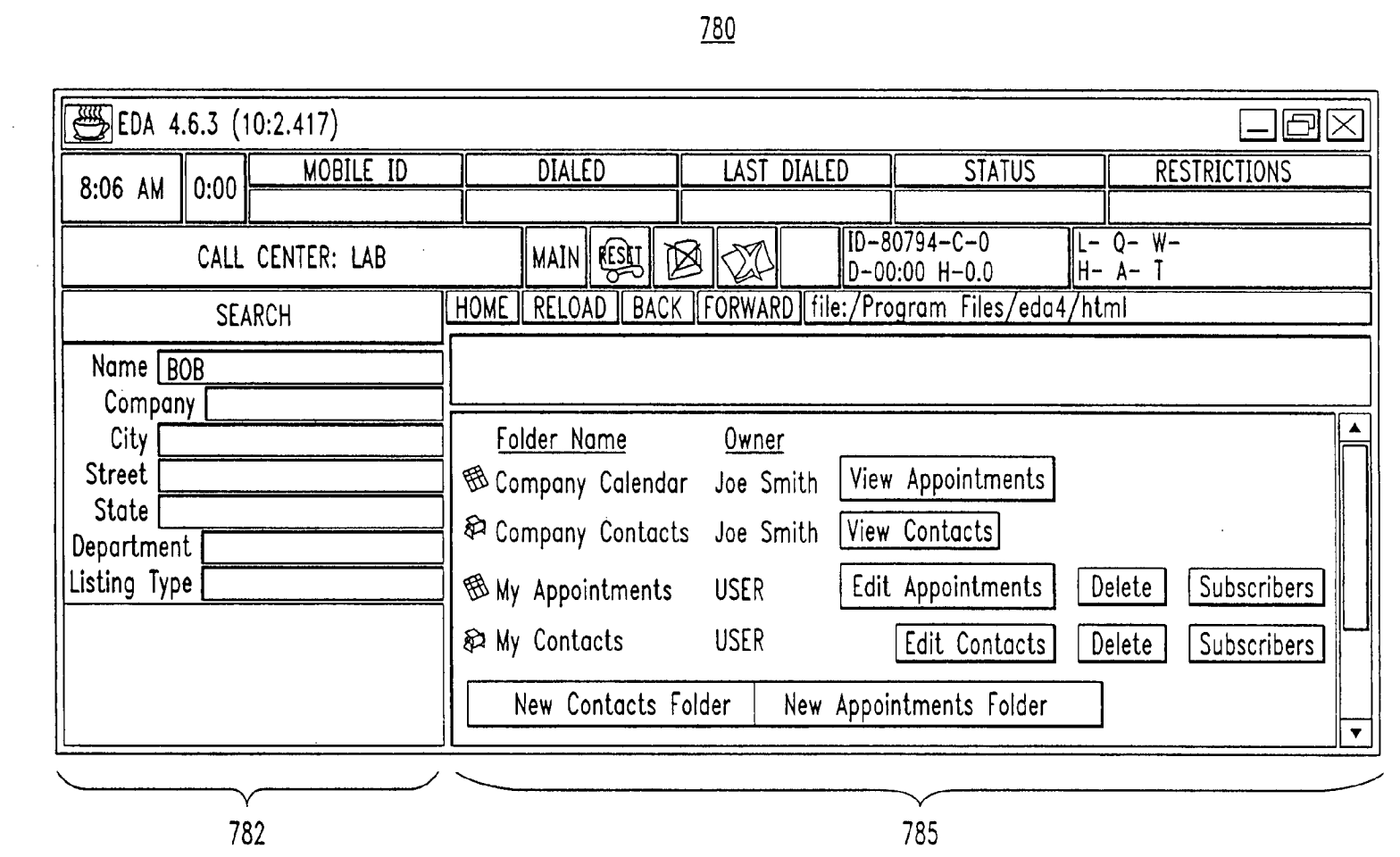

It is anticipated that when given more specific data about the desired contact, e.g., Bob's full name, the operator may also search such other directory databases as public national directory databases, enterprise directory databases (e.g., corporation directory databases, and university directory databases), etc., accessible by database server 226. To that end, GUI 780 in FIG. 17 is designed for the operator to perform such a combined search. As shown in FIG. 17, section 785 of GUI 780 corresponds to the Home GUI of FIG. 9, which allows the operator to manage contacts and appointments folders for the user as described before. In addition, section 782 provides the interface for the operator to perform the combined search for desired contact information.

Thus, in this example, when a user requests a listing of a desired party, say, Bob, the operator invokes GUI 780 on terminal 220. The operator enters at search section 782 the name Bob and any other information provided by the user to the best of his/her ability such as Bob's last name, the name of the company at which Bob works, his or his company's address, etc. In response to, no, or one or more search results meeting the user's request are returned from database server 226 accessing a public national directory database and enterprise directory databases in this instance, and/or from personalized information server 28 accessing folders 607 and 609 associated with the user. Each returned listing in this instance includes a source indicator indicating its provider, i.e., database server 226 or personalized information server 28. If multiple Bob listings are returned, the operator in a conventional manner discusses the listings with the user to ascertain the desired Bob listing. When the desired Bob listing is ascertained and selected by the operator for later possible connection to the listed telephone number for the user, and incorporation into one or more contacts folders associated with the user before the process ends.

Continuing the above example, upon learning the desired Bob listing, the operator offers the user an option to be connected to Bob's telephone number. If the user exercises such an option, the operator then initiates an outgoing call for the user by seizing an outgoing voice channel from a T1 communication link 214 and outdialing the desired telephone number. Outdialing is a function of platform 203, whereby platform 203 transmits the desired telephone number after it is entered. Host computer 228 is notified of the outgoing call and automatically instructs platform 203 to apply a CPA therein to the outbound channel and a DTMF receiver to the inbound channel after outdialing. Such a CPA is sensitive to, and capable of identifying, telephone connection status conditions and signals including ring tone, busy, reorder, PBX intercept, system intercept (tri)tone (SIT), vacant code, reorder-SIT, no circuit LEC, reorder-carrier, no circuit-carrier, dial tone, continuous on tone, and silence. Platform 203 afterwards connects the user on the inbound channel to the outgoing call on the outbound channel.

The CPA monitors the outgoing call on the outbound channel for a predetermined number of rings, a predetermined amount of time, or until a specified connection status is detected. A successful call, in which the destination telephone is answered, is recognized by platform 203. Illustratively, platform 203 identifies a successful call by detecting, on the outbound channel, the bit transition that occurs when the destination telephone converts from an on-hook status to an off-hook status. The detection of a successful call is relayed to host computer 228 by platform 203.

When an outgoing call is successfully completed, platform 203 remains passively connected to the call. When the destination telephone is disconnected, platform 203 detects another bit transition indicating that the destination telephone changed from off-hook to on-hook. In response, platform 203 removes the application of the CPA on the outbound channel. Voice server 230 then seizes the connection to user telecommunication device 244 to provide additional information and services to the user upon closing of the call, in accordance with another aspect of the invention. However, such additional information and services may alternatively be provided by voice server 230 in the beginning, or at other appropriate stages, of the call. In this instance, upon the call closing, the user is allowed to order new services, modify user profile record or request other actions. To that end, server 230 describes any new service feature which is made available to the user by the information assistance service provider. The description may be followed by a menu, including options selectable by pressing specified keys on device 244. Alternatively, the user's selection is spoken into device 244, which is received and recognized by a voice recognition device in voice server 230. For example, pressing the "1" key enables the user to adopt the new service feature; pressing the "*" key enables the user to speak to an operator to obtain furtherer information about the new service feature; and pressing the "2" key enables the user to skip to the next service feature description, if any. In this instance, upon detection of a depression of the "1" key by the user, voice server 230 invokes a submenu for the user to enter any necessary information to subscribe to the new service feature. User profile record 500 may then be updated to reflect the new service feature subscription.

After the new service feature description(s) and menu, voice server 230 may invoke an action menu to allow the user to perform or request other actions. For example, pressing the "*" key enables the user to be re-connected to an operator for further information assistance; pressing the "7" key enables the user to modify user profile record 500, e.g., through the agency of an operator, or a submenu to go through the profile entries item by item and make the necessary changes; pressing the "#" key enables the user to hear a recitation by voice server 230 of the desired destination telephone number just inquired; pressing the "8" key enables the user to incorporate the desired listing just inquired in a contacts folder associated with the user; etc. In this instance, the user's pressing the "8" key results in incorporating the desired listing into My Contacts folder 609, stemming from the fact that the user here has the aforementioned rights to edit My Contacts folder 609 only but not Company Contacts folder 607. Otherwise, if the user has the rights to edit multiple contacts folders, the folder involved in the incorporation needs to be specified by the user, e.g., in profile record 500 or upon request. In general, the incorporation is carried out pursuant to a predetermined protocol whereby the desired listing when incorporated would be properly formatted in folder 609.

We have recognized that based on information in user profile record 500, e.g., personal interests 540, the user may be targeted to receive certain advertising or promotional (e.g., schedules, coupons, discounts, etc.) information. For example, after (or before) an information assistance call, such targeted promotional information may be "pushed" to the user, subject to any opt-out provision in the profile. For example, the user in this instance specifies as part of personal interests 540 preferred music, e.g., Beatles, Rolling Stones, etc.; fashion, e.g., Versace, Donna Karen, etc.; and sports Events, e.g., Knicks basketball games, PGA Golf tournaments, etc., for which the user would like to receive information from time to time. In accordance with an aspect of the invention, based on the profile data, server 28 tailors the content of the promotional information delivered to the user to suit his/her interests as soon as the information becomes available. In particular, at the closing of the information assistance call, voice server 230 provides the targeted promotional information to the user. For example, voice server 230 at such time may inform the user of the schedule of upcoming Knicks games and a sale of Knicks merchandise. Voice server 230 may then prompt the user to reserve tickets for any desired games and purchase any desired merchandise through a concierge-type service also provided by information assistance service provider 205.

The targeted promotional information may also be provided as a message to the user from time to time via SMS, e-mail, voicemail, facsimile, paging, instant messaging, etc. For example, the actual method(s) of delivery of the targeted promotional information may be specified by the user in user profile record 500, shown as information delivery method preferences 550. Such information delivery method(s) may be established in the initial service registration by the user in response to such direct questions as "How do you want promotional information to be transmitted to you from an information assistance service?" The answers to such direct questions may make up preferences 550. The specified delivery methods may be prioritized in accordance with the user's preferences. Of course, the user is allowed to opt out one or more of the above targeted advertising service features.

Server 28 from time to time sends to profile gateway 231 the targeted promotional information to be delivered to the user. Gateway 231 generates a message containing the promotional information, and data concerning delivery methods ranked in the order of the user's preferences, as specified in profile record 500. This message is sent to profile manager 305, which in response generates an appropriate request to messaging server 307 for delivery of the targeted promotional information.

In this instance, messaging server 307 may be situated at the same location as profile manager 305. Server 307 serves as a gateway for delivering information to a user, e.g., via voicemail, SMS, e-mail, paging, facsimile, wireless application protocol (WAP), web, etc. When it is determined that the promotional information needs to be delivered via one of these communications, profile manager 305 forwards the necessary content and addressing information (e.g., voicemail access number, wireless telephone number for SMS, e-mail address, pager number, facsimile number, uniform resource locator (URL) of a WAP or web site, etc.) to messaging server 307. Messaging server 307 attempts a delivery of the promotional information via the appropriate method of delivery, and feeds back to profile manager 305 information about the delivery status. For example, in the event that a first preferred delivery method is not successful, server 307 informs manager 305 of the unsuccessful delivery status. In response, manager 305 may cause server 307 to attempt the delivery via a second preferred delivery method, and so on and so forth.

For example, where the targeted promotional information is delivered to a WAP or web site, the access (e.g., URL) to one such site may be provided, e.g., on the user's bill for the information assistance service. Similar to the Internet standards, WAP specifies use of a wireless markup language (WML), which is a subset of an extensible markup language (XML), for writing WAP content. WML is designed to make optimum use of a small display which is typical of a mobile device, e.g., wireless telephone, PDA, etc. The resulting WAP content is scalable, e.g., from a two-line text display to a full graphic screen of a larger display. The WAP content can be read by a user using WAP microbrowser software installed in the mobile device. The communications between the mobile device and the Internet is through a WAP gateway, which serves as an interface between a wireless network and the Internet.

The WAP gateway provides the necessary protocol translation (e.g., between WAP and transmission control protocol/Internet protocol (TCP/IP)) and optimization, security, activity tracking and administration. Messages communicated between a mobile device and the WAP gateway are in accordance with a WAP datagram protocol (WDP). For example, when a request from the mobile device which comprises a URL is sent via a wireless network to the WAP gateway, the request includes a device ID identifying the mobile device. In response, a hypertext transfer protocol (HTTP) interface in the gateway retrieves the requested content from the WAP site on the Internet at the URL. The retrieved content is converted into a compressed data format for transmission over the wireless network to the mobile device identified by its device ID. The WAP microbrowser software in the mobile device interprets the compressed data and displays the interactive WAP content. In this instance, the user's bill may provide the user with the URL of the WAP site for accessing the aforementioned promotional information, expressed in WML.

Similarly, the targeted promotional information may be expressed e.g., in HTML or XML, and placed on a website for the user to access anytime using a device running the necessary web browser software. The particular URL of the website may be designated to the user exclusively for his/her personal consumption.

Continuing with the above example, if the outgoing call to the destination telephone cannot be successfully completed, e.g., the call status condition of the outgoing call identified by the CPA as a busy signal, platform 203 terminates the outgoing call by releasing the outbound channel, with the inbound channel intact. In this case, like the previous successful call completion case, voice server 230 may similarly present the above-described new service feature descriptions, menus and targeted promotional information (collectively "user assistance and service information") to user telecommunication device 244. However, the user here may be afforded additional action menu options, e.g., an option to have platform 203 attempt the same destination telephone number again by pressing the "1" key, and another option to record a message for later delivery to the destination party by pressing the "2" key.

Voice server 230 may similarly present the user assistance and service information to user communication device 244 in the event that the call status condition of the outgoing call is detected by the CPA in platform 203 as a ring-no-answer condition. Under that condition, it is desirable to allow sufficient time for the destination party to answer the call, but yet also provide the user with the user assistance and service information, other than simply waiting continuously for an answer. At the same time, the ring tone on the outbound channel may be temporarily muted or its volume is temporarily reduced. In addition, voice server 230 may communicate, through the inbound channel, the user assistance and service information while the user is waiting. If the user chooses to do nothing and wait, the ring tone continues until the destination telephone is answered, or the user disconnects.

In the event that the call status condition of the outgoing call is identified as a communication problem, e.g., reorder, PBX intercept, SIT intercept, vacant code, reorder-SIT, no circuit LEC, reorder-carrier, no circuit-carrier, dial tone, continuous on tone, or silence, voice server 230 informs the user of the communication problem. In addition, voice server 230 may present to user communication device 244 the user assistance and service information described above.

In addition, the user when interacting with the information assistance service may prefer to use certain key or voice commands, over those suggested, e.g., in the menus. This may stem from the fact that it is easier for the user to remember those certain key or voice commands, and to consistently apply the same commands for the same frequently used functions. Thus, the user may be allowed to create his/her own "dictionary," denoted 560, in user profile record 500 to customize his/her own "vocabulary" or reconfigure commands for interacting with the information assistance service. System components (e.g., platform 203, computer 228 and voice server 230) of information/call center 200 are programmed to look up the dictionary to understand the user's customized commands to seamlessly provide the information assistance service. In this particular illustrative embodiment, dictionary 560 is realized as a look-up table, denoted 565, for translating customized commands to corresponding menu commands recognizable by the system components. In this instance, the menu commands which have been reconfigured include the "\*" key command for returning to an operator during an information assistance, and the "#" key command for providing the desired destination telephone number. As illustrated in table 565, the "\*" key command has been replaced by a "0" key command preferred by the user, and the "#" key command has been replaced by a voice command "Number Please" preferred by the user.

Temporary Service Disablement

As mentioned before, a user may also specify in a user profile record associated with an identifier (e.g., a telephone number) identifying the user's telecommunication device (e.g., a telephone) when the instant information assistance service is temporarily halted. Referring to FIG. 7, in this instance, the user specifies in profile record 500 that the service is temporarily disabled between 9:00 am and 5:00 pm Monday through Friday each week, shown as one of Temporary Service Disablement Periods 567. With the specified disablement period in place, when an information assistance call is received by center 200, computer 228 retrieves the user profile associated with the ANI of the received call. Computer 228 first determines whether the time of the call is within one of Periods 567. If so, computer 228 causes voice server 230 to make an announcement to the caller, e.g., "Sorry. The user has chosen to disable the service at this time." Computer 228 then causes the call connection to be torn down. Otherwise, if the time of the call is not within one of Periods 567, the call would be processed in the manner described before. The user may notify the service provider anytime when the service is to be temporarily disabled, and the user profile record is modified accordingly.

In accordance with a further aspect of the invention, Periods 567 may reference certain entries of a user's appointment folder, e.g., My Appointments 608 maintained in database 20. That is, a selected service disablement period may correspond to certain types of appointment or activity, e.g., vacation, specified in My Appointments, which is the case here as the user in this instance selected option 569 in profile record 500. The user may notify the service provider during the service registration or anytime subsequent thereto that a vacation time entry to My Appointments would trigger the service disablement for the period corresponding to the entry. Profile manager 305 is then programed to enter any such vacation time entry in profile record 500 as one of Periods 567. Alternatively, in My Appointments the user is provided with an option, associated with each appointment or activity entry, to disable the instant information assistance service during the appointment or activity. In response to a selection of one such option, manager 305 incorporates the new service disablement period in Periods 567.

Information Upload

In accordance with another aspect of the invention, the aforementioned personalized information management service is augmented to realize a personal information center function for the user. To that end, various information may be uploaded and stored in user profile record 500, which is to be delivered to the user as a routine part of the service or upon the user request. Such various information may include, e.g., account information, statuses of data synchronization between the information management tools and user devices, statuses concerning orders and sales conducted through the instant information assistance service, etc. In addition, based on the sales and orders history, the profile record may keep track of the user's likes and dislikes, which help customize promotional information to be communicated to the user. The manner in which the information assistance service helps the user to consummate an order or sales, and the manner in which the user profile is revised from time to time to update the user criteria in selecting goods or services are described, e.g., in the aforementioned '847 Application.

Service Differentiation and Pricing Based on Device Type

As is apparent from the foregoing discussion, services afforded by the instant service provider to the user depend on the type of user device, including its class of service, used to interact with the service provider. For example, the user device may be a wireless telephone. However, nowadays wireless telephones come with different classes of services, e.g., in accordance with "2G," "2.5G," and "3G" specifications. Even built according to the same general specification, one wireless telephone may vary from another in the screen size, support for graphics, enablement of one-way or two-way SMS, JAVA and/or WAP communications, etc. The data concerning the capabilities of a user device may be provided by the carrier (e.g., AT&T Wireless) which initially turns on the operation of the device, or by the user to the instant service provider, or by querying the device itself during an initial handshake with the device. Such device data may be recorded in the user profile record, e.g., device data 530 in profile record 500, which is important for both marketing and service customization purposes. For example, device data 530 in this instance indicates that the user device is a wireless telephone capable of SMS and complex graphics. With the knowledge of the SMS capability, the instant service provider may promote or provide, e.g., an SMS coupon service and other SMS related services to the user. In addition, with the knowledge of the complex graphics capability, the instant service provider may promote or provide to a user, e.g., a travel directions service with transmission of images of street maps displayable on the user device screen. Thus, the types of service offered to the user may vary with the type of user device, including its class of service. The service charges may vary with the actual services subscribed by the user. The user may be charged at a discount/premium rate depending on the actual service capability, class of service, and/or preferential status of the user. Different services may also be bundled according to the device capabilities. For example, the aforementioned SMS coupon and travel directions services may be bundled and offered to the user at a flat rate.

In addition, device data 530 is also conducive to an effective provision of the instant information assistance service. Specifically, the various service menus offered to the user in the course of information assistance are selected according to the user device capabilities. For example, where it is known that the user device has the SMS capability, which is the case here, a service menu would include such an option as to deliver information to the user device via SMS. Otherwise, the SMS option would not be offered.

It is possible that the user may use different user devices to communicate with the instant information assistance service at different times. In that case, device data 530 includes, for each device, a description of its capabilities and an associated identifier identifying the device, e.g., a telephone number, MDN, etc. In addition, profile record 500 may be invoked by any one of the identifiers of the user devices. For example, based on the ANI accompanying the communication from one such device, computer 228 invokes profile record 500 and retrieves the portion of data 530 corresponding to the device.

Personal Profile Security

In accordance with another aspect of the invention, security measures are instituted to ensure that only an authorized user(s) can access select services or groups of services, which may be associated, e.g., with the user's telephone number, MDN, voice print, etc. At the same time, the user who is responsible for the service charges or service account may controllably allow other parties (e.g., household members), associated with the service account, to access certain services by selectively providing them with, say, the requisite passwords meeting the security requirements. For example, the user in this instance institutes a security measure for use of a concierge-type service, whereby upon the user request, the instant service provider may make restaurant reservations, purchase tickets, order goods or services, and conduct other businesses for the user. As shown in FIG. 7, the concierge-type service in question is assigned security code(s) 535, which may be a password, PIN, mother's maiden name, voice print and/or other biometric measure. Where, e.g., a voice print is used, security code(s) 535 contains voice prints of the authorized users (e.g., husband and wife), which may be derived from earlier recordings of speeches by the husband and wife, respectively. In furtherance of the example, when the husband or wife using the same telephone to access the instant information assistance service, profile record 500 may be retrieved based on the ANI accompanying the telephone call. As the husband (wife) requests the concierge-type service in question, computer 228 determines based on profile record 500 that such a service requires verification of a security code. In this example, a voice print of the husband (wife) is derived by voice server 230 or a voice print gateway (not shown) from a sample of his (her) speech currently received thereby. Computer 228 determines whether the newly derived voice print corresponds to one of code(s) 535. If so, the husband (wife) can access the concierge-type service. Otherwise, if the security code cannot be verified, the husband (wife) is denied such a service. It should be noted that the content of code(s) 535 may be encrypted to bolster its security.

Confidential Information Disclosure

As mentioned before, ordering or purchasing products or services for a user is part of the concierge-type service provided by the instant service provider. Oftentimes, sales assisted by an operator involve disclosure by the user of credit card or similar billing information. However, the user may feel uncomfortable to disclose such confidential information to the operator for fear of any subsequent, fraudulent use of such information, or for fear of eavesdropping by others at the current user location. Thus, in accordance with yet another aspect of the invention, an operator assisted order, purchase or reservation may be realized by the user communicating with the instant service provider the details of the order, purchase or reservation except confidential information (e.g., the credit card or billing information), which may then be communicated to the instant service provider through a separate secure connection (e.g., a secure Internet connection), which does not involve an operator, to complete the transaction.

In an illustrative embodiment, the user is afforded an option to transmit billing information through a secure Internet connection separate from the initial information assistance call connection. A selection by the user of the secure transmission option may be indicated in profile record 500 (not shown) or on a call-by-call basis. For example, with such an option selected beforehand, the user may conduct a purchase with an operator's assistance during the initial information assistance call. Based on the phone conversation with the user, the operator may fill out on terminal 220 an order template containing information concerning the product name, its provider, price, delivery time, etc., all information, except billing information, necessary to complete the transaction. The operator may then inform the user that he/she needs to provide the remaining billing information via a secure Internet connection, e.g., an encrypted secure sockets layer (SSL) connection. The user may be asked to provide an e-mail address to which a URL of a transaction web page for the user to input the remaining confidential billing information is to be sent. In this illustrative embodiment, such a user e-mail address, denoted 537, is specified in profile record 500, thus obviating a query therefor.

With the user e-mail address, the operator causes terminal 220 to send to the user, through Internet 221, an e-mail containing the URL of the aforementioned transaction web page. Upon opening one such e-mail, e.g., using a personal computer, the user may point and click at the URL link therein to access the transaction web page. Such a transaction web page (denoted 1900) is illustrated in FIG. 18, which may be provided by a concierge-type service server (not shown) connected to Internet 221. Page 1900 make take the form of the order template previously used by the operator to fill out the order information. In fact, except for the confidential credit card information, all of the transaction information including, e.g., product name 1903, price 1905, etc. is pre-filled by the operator. The user in this instance is prompted to fill in box 1907 the credit card information only. Security indicator 1909 indicates that the communication of the information on page 1900, including the credit card information, to the concierge-type service server through Internet 221 is secure. Once the server receives the information on page 1900, the order is processed thereby.

It should be noted that in a second embodiment, the user is pre-assigned a URL where he/she can access to enter confidential information to complete each transaction, thereby obviating the need of sending an e-mail containing URL information to the user. In fact, in the second embodiment, the transaction web page is customized for the user, where a list of his/her applicable credit cards may be displayed for selection, thereby obviating the need of the user's entering the actual credit card information, i.e., the credit card number, expiration date, etc. In that case, the actual credit card information may be stored in the concierge-type service server, which was previously provided by the user, e.g., through a secure Internet connection. Only a token representing the selected credit card for use in the current transaction is sent to the server, and the latter looks up the corresponding credit card information in its storage based on the received token.

It should be noted that the above-described inventive concept is generally applicable to any transaction assisted by an agent, especially a human, which requires a user to disclose confidential information to complete the transaction. Such confidential information, e.g. a Social Security number, demographic information, etc., may be communicated through a secure communication connection separate from in an initial connection to the agent.

Synchronization and Backup

In accordance with another aspect of the invention, a first PIM, e.g., a user computer at work, may synchronize its data, e.g., contacts and appointment data, with a second PIM(s), e.g., a user computer at home, through the aforementioned information management service. The first PIM may be designated a "master" and the second PIM(s) may be designated "slave(s)" in that changes in the master are registered in the slave(s) after their synchronization through the information management service, but not the other way around.

Figure 19:
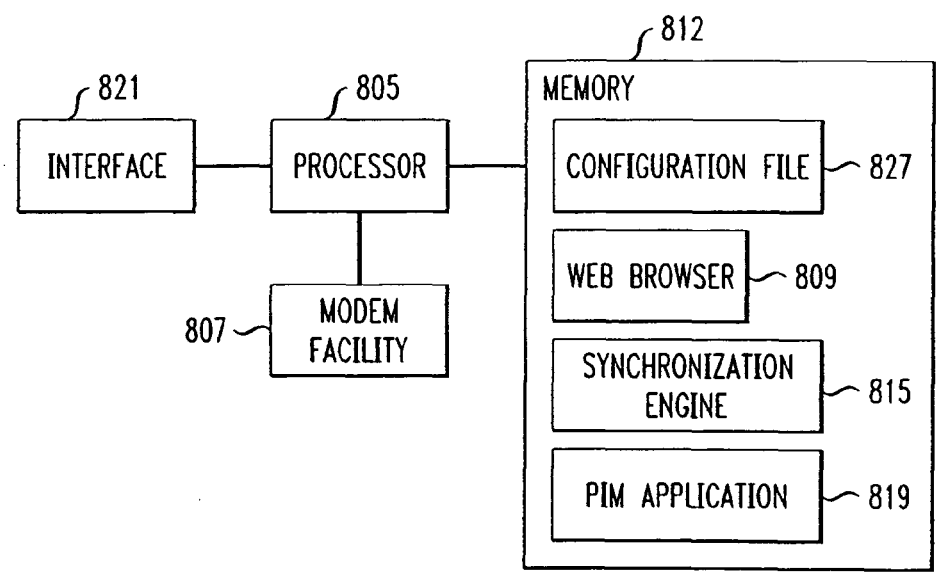
FIG. 19 illustrates a computer having a programmed personal information manager (PIM) function, in accordance with the invention.

In this example, work computer 803 in FIG. 19 incorporating conventional PIM application 819, e.g., a Microsoft Outlook, Outlook Express, Goldmine, Symantec Act!, Lotus Organizer and Lotus Notes application, may be the master PIM in accordance with the invention. Synchronization engine 815, also installed in computer 803, is used to perform the desirable synchronization function. In the event that the user wants to use engine 815 to synchronize with, say, a Palm-type device, one such device may be connected to computer 803 through external interface 821. In this illustrative embodiment, engine 815 is designed based on a commercially available Intellisync Connector SDK kit provided by Puma Technology, San Jose, Calif. Engine 815 may be downloaded from server 28 via the Internet and is configured according to PIM application 819 used. In configuring engine 815, all of the contacts and appointment folders in database 20 associated with the user are identified. However, only those contacts and appointments folders of which the user is either an owner or administrator can be selected to be synchronized with data sources in PIM application 819, stemming from the requirement that a folder can only be modified by its owner or administrator, but not its read-only subscriber. Thus, in this instance, since the user is the owner of My Contacts folder 609 and My Appointments folder 608, the user is afforded options to synchronize folder 609 and/or folder 608 with the corresponding PIM data sources (e.g., PIM contacts list and/or PIM calendar) specified by the user.

In this instance, when engine 815 is first downloaded from server 28, it is a "master" version, which is provided to the user only once as the user can have only one master PIM, i.e., work computer 803 in this example. To that end, server 28 records the master version download event in association with the user's login (e.g., phone number/username and password) to prevent a second download of the master version of the synchronization engine. Barring any manual intervention, server 28 upon subsequent user request will provide a "slave" version of the synchronization engine for a second PIM of the user's, presumably a slave PIM. Master synchronization engine 815 differs from a slave synchronization engine in that the former allows a bidirectional synchronization of the data sources in work computer 803 with the corresponding folders maintained by server 28. On the other hand, a slave synchronization engine only allows a unidirectional synchronization, wherein data in the folders is allowed to be downloaded to a slave PIM to revise those in the corresponding data sources, but not the other way around. That is, any changes in the data sources of the slave PIM have no effect on the folders maintained by server 28. Except for synchronization engine 815, a user home computer which is a slave PIM in this instance, may have similar PIM-related software to user work computer 803.

Information concerning the association of a folder with the PIM data source to be synchronized with the folder is stored in configuration file 827. After the initial set-up of engine 815 and file 827, each time when the user creates a folder or becomes an administrator of a folder, the user is afforded the option to associate the folder with the corresponding PIM data source.

The bidirectional synchronization may be initiated by the user or automated by synchronization engine 815 to synchronize the specified folders with the corresponding PIM data sources from time to time through a communications connection with server 28. For example, engine 815 may be programmed to perform unattended synchronizations at specified times, after computer 803 has been idle for a specified period, or when the user logs on/off computer 803. In addition, engine 815 may be programmed to suspend any automated synchronization while computer 803 is running on battery power. Similarly, the unidirectional synchronization in a slave PIM may be performed under the control of a slave synchronization engine. Thus, with the above-described arrangement, any revised data in data sources in the master PIM, given time, will flow to the corresponding data sources in the slave PIM(s) through server 28, thereby synchronizing the master PIM data sources with those of slave PIM(s).

Figures 20A, 20B, 21:
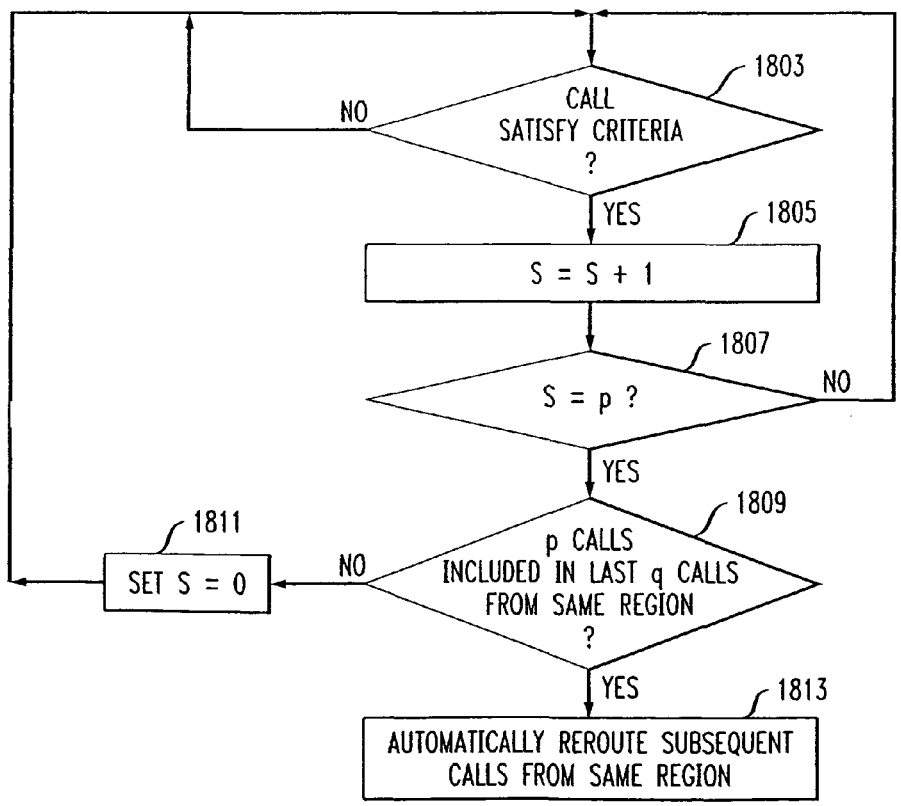
FIG. 20A illustrates data fields in a contacts recovery record in accordance with the invention.
FIG. 20B illustrates data fields in a calendar recovery record in accordance with the invention.
FIG. 21 is a flow chart depicting a routine for routing an incoming information assistance call by trend, in accordance with the invention.

In accordance with another aspect of the invention, synchronization engine 815 provides for recovery records in case the user makes a mistake in a synchronization with server 28. The recovery records may be in an ASCII format, delimited (such as pipe delimited) and stored in computer 803 in a packed file (e.g., pkzip) to efficiently utilize the capacity of memory 812. The recovery records contain essential fields. For example, as shown in FIG. 20A, a contacts recovery record in this instance contains First Name field 2203, Last Name field 2205, Job Title field 2207, Company field 2209, Business Address field 2211, Business Phone Number field 2213, Mobile Phone Number field 2215, Home Phone Number field 2217, E-Mail Address field 2219, and Web Address field 2221. As shown in FIG. 20B, a calendar (or appointments) recovery record in this instance contains Subject field 2251, Location field 2253, Attendees field 2255, Start Time and Date field 2257, End Time and Date field 2259, and Note field 2261 which may contain first 100 characters of a message. Recovery records are generated each time when a synchronization takes place to record the last version of the PIM data in their respective fields before the synchronization.

The user may specify to synchronization engine 815 how many days' worth of recovery records are stored. Utility on computer 803 deletes unwanted or expired recovery records. Engine 815 also provides a "recovery" option, which allows the user to select desired recovery records from storage. In recovery mode, the user may select to replace the current calendar and/or contacts list, add new data or update the differences, or both add and update.

Dynamic Call Routing by Trend

The inventive routing of an information assistance call to the user's preferred information/call center is fully described before. Another inventive routing strategy, barring any user's preference, is premised upon the statistics of the originations and content of previous information assistance calls received. For example, for international information assistance calls originating from Asia, the entry to the instant service is via a Los Angeles (LA) information/call center. That is, the LA center initially receives all of the calls from Asia. The caller of one such call may ask for directory assistance concerning a Chicago area. In response, the LA center may search for the Chicago information and handles the call even though Chicago is not its service area. In an alternative embodiment, upon learning the content of the call, the LA center may immediately re-route the call to a Chicago call center, assuming that the operators there may better help the caller because of their familiarity with Chicago.

In accordance with another aspect of the invention, based on the recent history or trend of the calls originating from the same area requesting information concerning a second area, such calls may be automatically re-routed to a different information/call center normally serving the second area. For example, if p of the last q calls originating from Taiwan, which were initially received by the LA center, request information concerning Chicago, the subsequent calls from Taiwan will automatically be re-routed by the LA center to the Chicago center whose operators are more knowledgeable about Chicago, thereby better assisting the caller, where p and q represent predetermined integers, q>p. In practice, computer 228 in the LA center keeps track of a running sum of calls (S) from each region, e.g., Taiwan, requesting information concerning an area normally not served by the LA center, e.g., Chicago. Thus, in this example, computer 228 determines whether an incoming call satisfies certain criteria before the running sum S associated with Taiwan is incremented, as indicated in step 1803 in FIG. 21, where S is initially set to zero. The criteria are satisfied when computer 228 determines that the ANI of the incoming call corresponds to a Taiwan origination, and (1) that a database concerning the Chicago area has been invoked and searched via server 226, which is in communication with computer 228, or (2) that the incoming call has been re-routed from the LA center to a Chicago center through platform 203, which is also in communication with computer 228. If it is determined that such criteria are not satisfied, the subject routine returns to step 1803. Otherwise, computer 228 at step 1805 increments S by one. Computer 228 at step 1807 determines whether S=p. If not, the routine again returns to step 1803. Otherwise, the routine proceeds to step 1809 where computer 228 determines whether the p calls are included in the last q calls originating from the same region, i.e., Taiwan in this instance. If not, the routine proceeds to step 1811 where computer 228 resets S to zero and returns to step 1803 to restart the process. Otherwise, if it is determined that the p calls are included in the last q calls originating from the same region, computer 228 causes platform 203 automatically reroute the subsequent calls from the same region, i.e., Taiwan, to the Chicago center, as indicated in step 1813. After the automatic rerouting performed for a predetermined period or number of subsequent calls from Taiwan, the routine may return to step 1811 to re-assess the call trend.

Enhanced Telecommunications Service

In prior art, information assistance including, e.g., searching for a desired destination party's telephone number, is considered a special service. Information assistance service charges typically are tagged onto telecommunication charges for utilizing a carrier's network facility to complete the user's call to the destination party. The information assistance service and the telecommunication service typically are priced on different bases. For example, the information assistance service charges typically are determined on a per call basis whereas the telecommunication charges are determined based on the connection time, although the two different charges for an information assistance call may be consolidated in the same bill to the user.

A new "enhanced" telecommunication (telecom) service concept has been developed, which stems from a recognition of the multifarious service features affordable by an information assistance service, which have been developed over time and include, e.g., the personalized service features, private directory and calendar service features, and concierge-type service features described above. The enhanced telecom service is born out of an anticipation of a user's or a destination party's taking advantage of the various information assistance service features, even though the user when initially making a call to the destination party may have no intent to use any of the service features. In a preferred embodiment, the provider of the enhanced telecom service has both information assistance capability and network capacity for connecting a user to a destination party. For example, an enhanced telecom service provider may be an improved information assistance service provider having network capacity (e.g., PSTN, wireless, and/or private network capacity) at its disposal, e.g., by leasing capacity and equipment from a carrier. Thus, the enhanced telecom service provider has end-to-end connectivity, readily providing information assistance to a user at his/her initiative during a call. With connectivity costs within its control, the enhanced telecom service provider may charge for the enhanced telecom service according to a single fee schedule, notwithstanding the fact that the user may have utilized both information assistance and telecom services during the same call, for which in prior art are charged according to the respective fee schedules. For example, the provider may charge the enhanced telecom service strictly on a connection time basis, e.g., 9 cents per minute of the call, regardless of the number of invocations of information assistance and connections to different destination parties during the same call. Another time-based arrangement may be a flat fee for an initial block of minutes (e.g. $1.00 for the first 15 minutes) of call time, after which there would be a fixed charge per minute. A flat fee for each call regardless of the call duration may also be practical under the present enhanced telecom service model. A "cafeteria" style plan which may involve separate charges for each service provided may be practical as well.

Advantageously, the enhanced telecom service model is conducive to saving such administrative costs as would otherwise be incurred in prior art where the information assistance and telecommunication service charges are determined separately. Especially where the information assistance service provider and the carrier are independent in prior art, the administrative needs of collecting off-line information concerning assistance service charges due the service provider, associating such charges with the corresponding telecommunication charges due the carrier, and combining both charges for billing a user is advantageously obviated by implementing the present enhanced telecom service model.

However, it will be appreciated that even under the present enhanced telecom service model, a provider may still levy extra charges on a user for specific service features.

The enhanced telecom service may be accessed via a designated telephone number, e.g., 1010-XXX-XXXX, 800-XXX-XXXX number, etc. Such a designated number may be publicized in many ways. For instance, the number may be imprinted on a credit card (especially when services are charged to the credit card), prepaid calling card, telephone charge card, etc. When a user accesses the enhanced telecom service via the designated telephone number, in accordance with another aspect of the invention, the user is afforded an option to begin the call with an information assistance service, as indicated at step 1003 in FIG. 22. If the user selects such an option, the call is routed at step 1006 to an operator to provide information assistance in a manner described below. (The term "operator" used herein broadly encompasses entities that are capable of providing information assistance in a telecommunication environment, including without limitation human operators, voice response/recognition capabilities, web-/WAP-enabled operator services, and other automated and electronic access.) Otherwise, if the aforementioned option is not selected, the user is prompted at step 1009 to enter the destination number which the user wants to call, with the understanding that he/she is able to invoke information assistance any time during the call. In fact, a technique for invoking information assistance and services during a call by a caller or a called party is described, e.g., in copending, commonly assigned application Ser. No. 10/313,712 filed on Dec. 6, 2002, which is incorporated herein by reference. For example, using the disclosed technique, a enhanced telecom service provider may monitor for a predetermined signal such as a DTMF tone or SS7 out-of-band signal initiated by either party's depressing a predetermined key on a telephone. Once one such signal is detected, an operator is conferenced into the call to provide information assistance to the party(ies). At step 1012 the user's call is routed to the destination party through a telecommunication network, wherein a device, e.g., in platform 203, is used to monitor on the call connection for the predetermined signal invoking information assistance, as indicated at step 1015. Thus, depending on a detection of the predetermined signal, step 1015 may be followed by step 1006 for providing information assistance (indicated by a dashed line connection). It should also be pointed out that step 1006 may be followed by step 1009 (indicated by a dashed line connection) when, for example, the information assistance provided at step 1006 includes searching for a desired destination number, and connecting the user to the desired destination number.

In an alternative embodiment, the user may be provided with two enhanced telecom service access numbers, one of which corresponds to starting the user's call with an information assistance service, and the other corresponds to allowing the user to call the destination number directly, with the ability to invoke information assistance anytime during the call. In addition, different access numbers may be provided for different branding.

A user when making a call through the enhanced telecom service may be identified, e.g., by an ANI, by an entry of a user identification (ID), password, PIN, mother's maiden name, etc., or by voice recognition, voice print, speaker verification or other identification techniques. As described before, the user may be afforded service features specified in a user profile record, e.g., identified by the ANI. The user profile record may contain personal preferences which may be selected by the user during an initial registration with the enhanced telecom service provider, and which may be modified subsequently.

For example, the user may be an employee of a company, which subscribes to the enhanced telecom service. The user profile record may specify the information assistance service features selected by the company, and identify access to the company's corporate directory and other company-specific services. In addition, if the user utilizes the company's facility to make an outside call, the user may be prompted for an entry of a charge number authorized by the company to fully take advantage of the enhanced telecom service.

Billing for the enhanced telecom service may be by credit card, prepaid calling card, debit card, direct billing to subscribers, or billing through a third party which may already have a billing relationship with the subscribers for other services, e.g., utilities.

Figure 22:
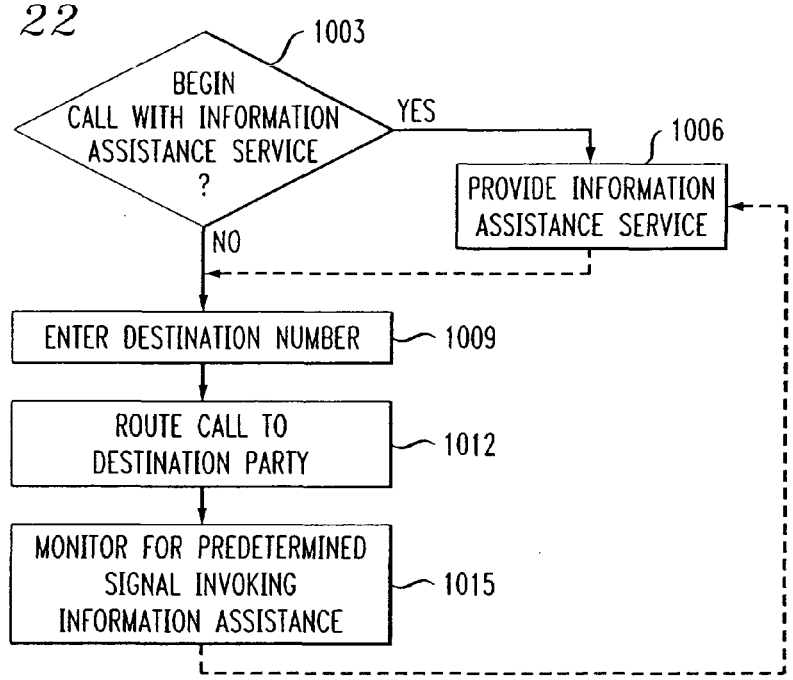
FIG. 22 is a flow chart depicting a routine for use in an enhanced telecommunications service, in accordance with the invention.

In an illustrative embodiment, the user calls the aforementioned designated number to access the enhanced telecom service. The call is routed through a telecommunication network to an information assistance center and terminated at switching matrix platform 203 in information/call center 200. Referring to FIGS. 2A and 22, once a call is received, host computer 228, in cooperation with voice server 230, carries out step 1003. If the caller opts to begin the call with information assistance, the call is routed to, or queued for, an operator. Otherwise, host computer 228 causes voice server 230 to prompt the caller to enter a destination number. In response to an entry of the destination number, platform 203 routes the call through an outgoing T1 span 214 to a destination party at the destination number. After the connection is made, either the caller or the destination party may invoke an information assistance service, and the operator would join the call through platform 203 as a conferenced party in a 3-way conference call. Either party could then request the operator to render information assistance, e.g., directory assistance, a concierge-type service described above, etc. Invocation of an information assistance service may be realized by either party's pressing a key (such as "0," "#," or "*") or voicing a command (e.g., uttering "operator") while a digital signal processing device in platform 203 is programmed to monitor the call connection for the resulting DTMF tone or voice command (i.e., a predetermined signal).

It should be noted at this point that after the operator joins the call, the caller may exercise different options by voice commands or by pressing predetermined keys on his/her telephone (DTMF tones), respectively. For example, a first option may be allowing the caller to control the destination party's ability to hear any conversation between the caller and the operator. A second option may be allowing the caller to disconnect the destination party from the call so that the caller can have an exclusive conversation with the operator.

User Identity Pre-Validation

Figure 23:
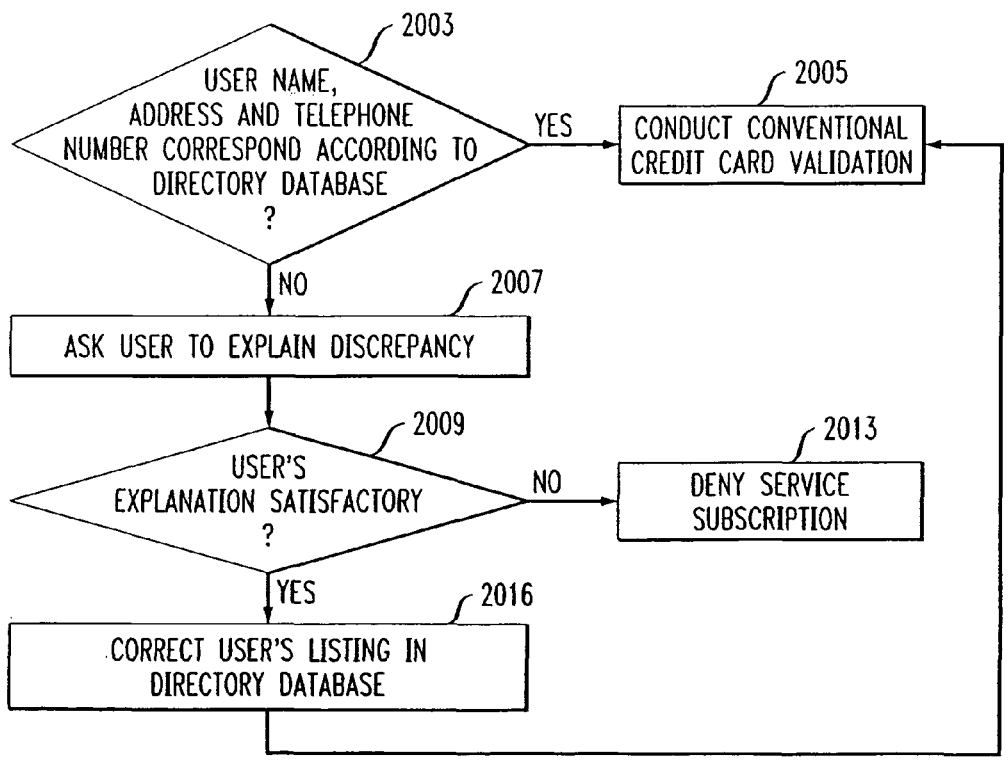
FIG. 23 is a flow chart depicting a routine for pre-validation of a user's identity, in accordance with the invention.

When a user calls the instant service provider to subscribe, e.g., to the enhanced telecom service, he/she may provide his/her name, address, telephone number (e.g., ANI) and credit card information for registration purposes, and authorize the subsequent calls to be charged to the credit card identified. In accordance with an aspect of the invention, the instant service provider, having access to a telephone directory database(s), pre-validates the credit card user by conducting a search of the directory database through server 226 based on the user information. Specifically, the service provider in this instance verifies whether the user's name, address and telephone number provided by the user correspond according to the directory database, as indicated at step 2003 in FIG. 23. In other words, the directory database is searched to verify whether the user in question is actually listed as having the telephone number and/or the address currently claimed by the user. If the user information is verified, the user's credit card is pre-validated, and the subject process may proceed to step 2005 where a conventional credit card validation may be conducted. It should be noted that a conventional credit card validation each time incurs a fee, e.g., 22 cents, to the instant service provider, regardless of whether the credit card is validated. The pre-validation process of FIG. 23 improves the success rate of conventional validation of a credit card, thereby saving unnecessary credit card validation costs.

If the user information cannot be verified at step 2003, the subject process proceeds to step 2007 where an operator may ask the user to explain the discrepancy, especially when the user information is similar to that in the directory database. At step 2009, the operator determines whether the user's explanation is satisfactory. If not, the user may be denied the service subscription, as indicated at step 2013. Otherwise, if the user's explanation is satisfactory, at step 2016 the operator may, with the user's approval, correct the user's listing in the directory database to adopt the information supplied by the user, thereby updating the directory database. The subject process then return to step 2005 described before.

It should be noted that the above-described pre-validation process not only is applicable to credit cards, but also debit cards, prepaid cards, and other financially or legally related instruments or transactions. In addition, for a modest fee other entities may be allowed to access the directory database maintained by the instant service provider to take advantage of the pre-validation process.

The foregoing merely illustrates the principles of the invention. It will thus be appreciated that those skilled in the art will be able to devise numerous other arrangements which embody the principles of the invention and are thus within its spirit and scope.

For example, the invention equally applies regardless of whether feature group D (FGD) type signaling, SS7 out-ofband signaling or other signaling is used for communications between carrier switches and switching matrix platform 203 of FIG. 2A.

Figure 24:
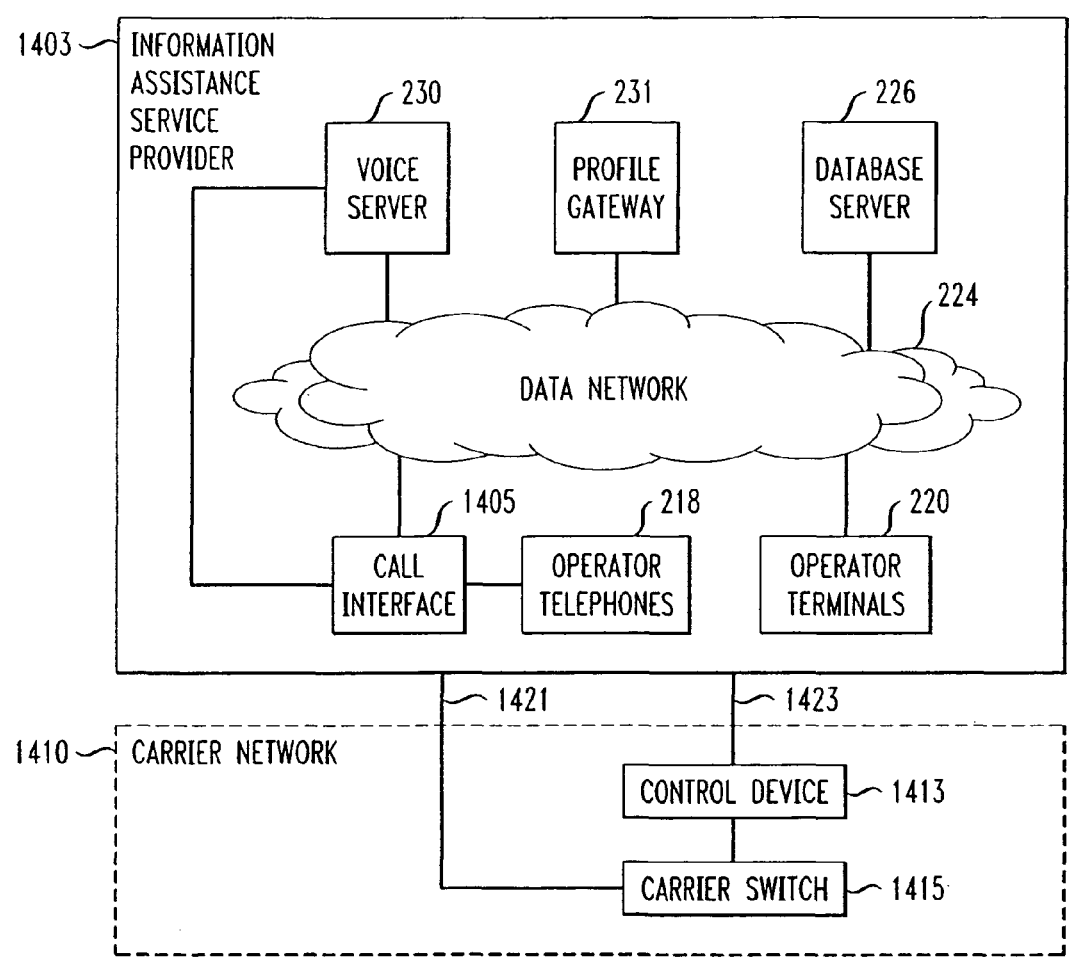
FIG. 24 illustrates an alternative information/call center configuration.

In addition, information/call center 200 may be configured differently from the above-described configuration. FIG. 24 illustrates an alternative information/call center configuration. As shown in FIG. 24, the alternative system has call interface 1405 in information assistance service provider, which is no longer connected to servicing platform 210. The functionality of platform 210 principally is carried out in carrier network 1410 in the alternative system. In fact, control device 1413 in network 1410 performs similar functions to host computer 228, and carrier switch 1415 performs not only its conventional carrier switching functions, but also those of switching matrix platform 203 described before, under control of device 1413. In this alternative system, an information assistance call is recognized by control device 1413 when it is routed through carrier switch 1415. Device 1413 causes the information assistance call to be connected through one of pre-designated direct inward dial (DID) connections 1421 to provider 1403, which is received by call interface 1405 therein. Interface 1405, connected to operator telephones 218, includes the aforementioned ACD logic for distributing the call to an operator at one of telephones 218 in a conventional manner. In the event that the information assistance call needs to be connected to a desired destination number, the operator causes the destination number and a "call completion" command to be transmitted to control device 1413 via Internet connection 1423. In response, control device 1413 instructs switch 1415 to connect the instant information assistance call to the received destination number. As per the instructions, switch 1415 completes the call to the destination number.

Finally, information/call center 200 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A method for providing an information assistance service accessible by different devices, comprising:
    receiving an information assistance call from a caller which originates from a device;
    identifying one or more capabilities of the device;
    providing to said device an information requested; during said call, eliciting by the agent nonsensitive information from the caller through a first communication connection and generating an order template including said nonsensitive information; and
    providing a web page data location for the caller where said caller can connect to said page and enter a sensitive financial information through a second communication connection into the existing order template already including said nonsensitive information;
    accessing a plurality of advertising information items, said advertising information items being in a plurality of different formats;
    selecting one advertising information item among the plurality of accessed advertising information items to be delivered to said device, wherein said selection of said one advertising information item is based on, at least in part, said identified one or more capabilities of said device.

2. The method as claimed in claim 1, wherein said providing of said information assistance further includes the step of providing a location information displayed graphically on the device.

3. The method as claimed in claim 1, wherein a user of said device is charged a discount rate for said information assistance service in exchange for accepting coupons.

4. The method as claimed in claim 1, wherein said advertising information item delivered to said device, allows for interaction by a user of said device.

5. The method as claimed in claim 4, wherein said interaction allowed on said advertising information item includes providing command options related to additional directory assistance service options beyond the provided information requested.

6. The method as claimed in claim 1, wherein said advertising information item is selected among a plurality of available advertising information items, based on content of said user's information assistance request.

7. The method as claimed in claim 6, wherein said content of said user's information assistance request is stored in a user profile.

8. A method for providing an information assistance service accessible by different devices, comprising:
    receiving a call from a caller which originates from a device;
    identifying one or more capabilities of the device;
    identifying one or more aspects of a personal profile of a user of said device;
    providing to said device an information requested; during said call, eliciting by the agent nonsensitive information from the caller through a first communication connection and generating an order template including said nonsensitive information; and
    providing a web page data location for the caller where said caller can connect to said page and enter a sensitive financial information through a second communication connection into the existing order template already including said nonsensitive information;
    accessing a plurality of advertising information items, said advertising information items being in a plurality of different formats;
    selecting one advertising information item among the plurality of accessed advertising information items to be delivered to said device, wherein said selection of said one advertising information item is based on at least in part, said identified one or more capabilities of said device and in accordance with said profile.

9. The method as claimed in claim 8, wherein said advertising information item is an electronic coupon delivered to said device.

10. The method as claimed in claim 9, wherein said coupon, provided to said device, allows for interaction by a user of said device.

11. The method as claimed in claim 10, wherein said interaction allowed on said coupon includes providing command options related to additional directory assistance service options beyond the provided information requested.

12. The method as claimed in claim 8, wherein said advertising information items are sent on a periodic basis apart from direct response to said received information assistance requests.

13. The method as claimed in claim 8, wherein said advertising information items are delivered to said device in manner specified in said personal profile of a user of said device.

14. The method as claimed in claim 13, wherein said profile includes at least two different manners of delivery of said advertising information item, wherein said manners of delivery are ranked by preference.

15. The method as claimed in claim 14, wherein said step of delivery of said advertising information item includes delivering said advertising information item in a manner of delivery that is highest ranked, and if said delivery is unsuccessful, delivering said advertising information item in accordance with the next highest preference.

* * * * *